United States Patent
Goodrich et al.

(10) Patent No.: US 10,931,916 B2
(45) Date of Patent: Feb. 23, 2021

(54) APPARATUS, METHOD AND COMPUTER-READABLE MEDIUM FOR AUTOMATICALLY ADJUSTING THE BRIGHTNESS OF A VIDEOPHONE VISUAL INDICATOR

(71) Applicant: Sorenson IP Holdings, LLC, Salt Lake City, UT (US)

(72) Inventors: Isaac Goodrich, Taylorsville, UT (US); Brent Giles, Kaysville, UT (US); Jarret Gill, Houston, TX (US); Steve Lassche, Kaysville, UT (US); Brian Davies, West Jordan, UT (US); Richard Shields, Pleasant Grove, UT (US); Jeremy Larsen, Herriman, UT (US)

( * ) Notice: Subject to any disclaimer, the term of this patent is extended or adjusted under 35 U.S.C. 154(b) by 0 days.

(21) Appl. No.: 16/392,624

(22) Filed: Apr. 24, 2019

(65) Prior Publication Data
US 2020/0344446 A1    Oct. 29, 2020

(51) Int. Cl.
| | | |
|---|---|---|
| *H04N 7/14* | (2006.01) | |
| *H04N 5/58* | (2006.01) | |
| *H04M 1/57* | (2006.01) | |
| *G08B 5/36* | (2006.01) | |

(52) U.S. Cl.
CPC ............... *H04N 7/142* (2013.01); *G08B 5/36* (2013.01); *H04N 5/58* (2013.01); *H04N 7/147* (2013.01); *H04M 1/576* (2013.01)

(58) Field of Classification Search
USPC ...................................................... 348/14.01
See application file for complete search history.

(56) References Cited

U.S. PATENT DOCUMENTS

| | | | |
|---|---|---|---|
| 5,946,636 | A | 8/1999 | Uyeno et al. |
| 5,973,618 | A | 10/1999 | Ellis |
| 6,016,038 | A | 1/2000 | Mueller et al. |
| 6,150,774 | A | 11/2000 | Mueller et al. |
| 6,166,496 | A | 12/2000 | Lys et al. |
| 6,186,003 | B1 | 2/2001 | Kikuchi et al. |
| 6,211,626 | B1 | 4/2001 | Lys et al. |
| 6,278,944 | B1 | 8/2001 | Lui et al. |
| 6,340,868 | B1 | 1/2002 | Lys et al. |
| 6,459,919 | B1 | 10/2002 | Lys et al. |

(Continued)

FOREIGN PATENT DOCUMENTS

| | | |
|---|---|---|
| EP | 1324578 A2 | 7/2003 |
| GB | 2383716 | 7/2003 |
| WO | WO 0307755 A2 | 9/2003 |

*Primary Examiner* — Amal S Zenati

(57) ABSTRACT

A videophone apparatus and a method for automatically adjusting a videophone visual indicator are provided. The videophone includes a camera unit with an imager. Data from the imager and imager data processed by an image signal processor may be converted into a value that can be compared to a scale correlating to a brightness condition of an area in which the imager is located, allowing the brightness condition to be determined. The visual indicators of the videophone can be set to illuminate based upon the determined brightness condition. Thus, the brightness condition of a room can be determined using components already found on the videophone, without the need for additional sensors, hardware or software that increase the cost and complexity of the videophone.

28 Claims, 9 Drawing Sheets

(56) References Cited

U.S. PATENT DOCUMENTS

| | | | |
|---|---|---|---|
| 6,528,954 B1 | 3/2003 | Lys et al. | |
| 6,577,080 B2 | 6/2003 | Lys et al. | |
| 6,608,453 B2 | 8/2003 | Morgan et al. | |
| 6,717,376 B2 | 4/2004 | Lys et al. | |
| 6,720,745 B2 | 4/2004 | Lys et al. | |
| 6,788,011 B2 | 9/2004 | Mueller et al. | |
| 6,806,959 B2 | 10/2004 | Mueller et al. | |
| 6,888,322 B2 | 5/2005 | Dowling et al. | |
| 6,897,624 B2 | 5/2005 | Lys et al. | |
| 6,975,079 B2 | 12/2005 | Lys et al. | |
| 6,990,955 B2 | 1/2006 | Niimi | |
| 7,135,824 B2 | 11/2006 | Lys et al. | |
| 7,231,060 B2 | 6/2007 | Dowling et al. | |
| 7,242,152 B2 | 7/2007 | Dowling et al. | |
| 7,352,339 B2 | 4/2008 | Morgan et al. | |
| 7,385,359 B2 | 6/2008 | Dowling et al. | |
| 7,443,964 B2 | 10/2008 | Urban et al. | |
| 7,610,044 B2 | 10/2009 | Sindoni | |
| 7,642,730 B2 | 1/2010 | Dowling et al. | |
| 7,764,026 B2 | 7/2010 | Dowling et al. | |
| 7,769,141 B2 | 8/2010 | Cupal et al. | |
| 8,605,141 B2 | 12/2013 | Dialameh | |
| 8,886,462 B1 | 11/2014 | Cioffi | |
| 2002/0183098 A1 | 12/2002 | Lee et al. | |
| 2002/0196913 A1 | 12/2002 | Ruckart | |
| 2003/0228003 A1 | 12/2003 | Vardon | |
| 2007/0112877 A1 | 5/2007 | Hornal et al. | |
| 2008/0167995 A1 | 7/2008 | Cue et al. | |
| 2013/0250078 A1 | 9/2013 | Levy | |
| 2015/0163414 A1* | 6/2015 | Nikkanen | H04N 5/2351 348/229.1 |
| 2019/0379839 A1* | 12/2019 | Hellerud | G01L 17/005 |

\* cited by examiner

| LUX | Camera 1 | Camera 2 | Camera 3 | Camera 4 |
|---|---|---|---|---|
| 5 | 0.52 | 0.51 | 0.37 | 0.70 |
| 10 | 0.95 | 0.94 | 0.70 | 1.35 |
| 20 | 1.76 | 1.75 | 1.26 | 2.61 |
| 30 | 2.78 | 2.66 | 1.88 | 3.79 |
| 40 | 3.61 | 3.57 | 1.24 | 5.03 |
| 50 | 4.55 | 4.46 | 1.89 | 6.09 |
| 60 | 5.42 | 5.45 | 2.56 | 7.59 |
| 70 | 6.23 | 6.53 | 4.43 | 8.81 |
| 80 | 7.45 | 7.17 | 5.19 | 10.28 |
| 90 | 7.95 | 8.21 | 5.69 | 11.82 |
| 100 | 8.95 | 9.09 | 6.39 | 13.16 |
| 110 | 9.94 | 10.15 | 7.04 | 14.26 |
| 120 | 10.98 | 10.75 | 7.55 | 15.98 |
| 130 | 11.82 | 11.75 | 8.02 | 17.46 |
| 140 | 13.01 | 12.52 | 8.90 | 18.56 |
| 150 | 13.71 | 13.46 | 9.56 | 20.10 |

APPARATUS, METHOD AND COMPUTER-READABLE MEDIUM FOR AUTOMATICALLY ADJUSTING THE BRIGHTNESS OF A VIDEOPHONE VISUAL INDICATOR

FIELD

The following description relates generally to videophone devices, systems and methods, and more particularly to automatically adjusting the brightness of videophone visual indicators.

BACKGROUND

Video telephony comprises the technologies used to receive and transmit audio-video signals by users at different locations. A videophone is a telephone with a video display, capable of simultaneous video and audio signals for communication between people in real-time. One important application of videophones includes sign language transmission for deaf, hard-of-hearing and speech-impaired ("DHOHSI") individuals. Videophones are used by DHOHSI individuals to call others using sign language through a Video Relay Service ("VRS"). Videophones are also used to do on-site sign language translation via Video Remote Interpreting ("VRI"). The DHOHSI individual place VRS and VRI calls using a videophone, which are routed through an interpreting center. An interpreter, fluent in ASL or a foreign sign language and the equivalent spoken language, appears on the DHOHSI individual's videophone. The DHOHSI caller signs the first part of a conversation to the interpreter, who simultaneously translates and speaks that first part to the call recipient over a phone line. The call recipient responds by voice to the interpreter with a response. The interpreter translates the response and signs that part to the DHOHSI individual who sees the signed response on their videophone screen. Thus DHOHSI individuals can have calls with DHOHSI or non-DHOHSI individuals in substantially real time. This 24/7 Video Relay Service is provide in the United States by the U.S. government's Telecommunications Relay Service (TRS) fund. Other countries also provide such services free of charge to the DHOHSI community.

Incoming calls to DHOHSI individuals work the same way, but in reverse and with some minor changes. When a call comes into a DHOHSI on their video phone, they are notified of the call by visual indicators such as lights. When calls are connected, the videophone of the DHOHSI individual receiving the call flashes or provides some other visual indication that a call has come in. The DHOHSI uses the videophone to take the call and can converse with a non-DHOHSI person as described above or with another DHOHSI person through signing to each other on their respective video phone screens.

One problem with existing videophones however, is that the videophones may only have one visual indicator brightness setting. Accordingly, if the videophone is used in a very bright environment, the videophone visual indicators may not be bright enough, in contrast with the surrounding environment, to get the attention of the DHOHSI individual. Unfortunately, existing videophone allow DHOHSI individuals to miss important phone calls. Conversely, when a call comes in at night in a dark room, the brightness of the triggered visual indicators can be relatively blinding to the DHOHSI individual. The solution to this problem for many DHOHSI individuals is to simply turn off the videophone. This ensures that important calls coming in will be missed.

Some videophones may have manual settings to control the brightness of visual indicators, but those are often set to the wrong settings for given brightness conditions that are continually changing. Thus, these videophones suffer the same problems described above.

There are some devices, other than videophones, that detect brightness conditions. However, these devices require additional hardware and software such as an ambient light sensor. Additional hardware and software can increase the cost, size and complexity of the videophone.

It would be an advantage to provide a videophone that can determine a brightness condition in a space and automatically adjust the brightness level of the videophone visual indicators accordingly. It would be a further advantage if the videophone could do this using components that, because of their necessity to a fully functionally videophone, are already part of the device. It would be a further advantage to provide a videophone that could automatically adjust the brightness of its visual indicators without increasing the complexity, cost and space limitations by adding hardware and software such as an ambient light sensor.

Such a videophone and method is disclosed and claimed herein.

BRIEF SUMMARY

The present disclosure generally describes a videophone capable of automatically adjusting a brightness level of a visual indicator on a videophone. Exemplary embodiments of a videophone may include an imager and an image signal processor. In one example, the imager and image signal processor are part of a camera unit of the videophone. The videophone may include a memory for storing instructions or executable code. A processor may execute the instructions to implement or perform various functions, features, aspects, algorithms methods and/or processes of the videophone to determine and adjust a brightness level of the visual indicator. In one embodiment, the processor may receive an image signal and/or a processed image signal from the imager or the image signal processor. The image signal and/or processed image signal may be converted into a value that can be compared to a brightness condition scale to determine a brightness level of an area in which the imager is located. The determined brightness condition may be used to automatically set the visual indicator to a certain brightness level corresponding to a current brightness condition of the area.

An aspect of the disclosure provides a method of automatically adjusting a brightness level of a videophone visual indicator. The method of automatically adjusting the brightness level of the visual indicator includes receiving at least one value corresponding to at least one of an image signal and a processed image signal from one or both of the imager and the image signal processor. The method may include using the at least one value corresponding to at least one of an image signal and a processed image signal to determine a brightness condition of an area in which the imager is located. The method may also include setting the visual indicator to emit light at a brightness level corresponding to the determined brightness condition.

Another aspect of the disclosure provides a non-transitory computer-readable medium storing program instructions that, when executed on one or more processors of the videophone, automatically adjust the brightness of a visual indicator according the method steps briefly discussed above. The non-transitory computer-readable medium may be part of a computer product.

Accordingly, embodiments of a videophone disclosed herein allow for the automatic detection of brightness levels by using components of the videophone camera unit, which are already on the videophone. Embodiments disclosed herein can also automatically adjust the brightness level of videophone visual indicators so that they are more easily discernable by DHOHSI individuals. This decreases the possibility that a DHOHSI individual will miss a call. It also provides the convenience of not having to remember to manually change the settings. The embodiments described herein provide these advantages without increasing the cost, complication and size increase that comes with adding separate sensors or components for determining the brightness of an area.

These and other embodiments, features, and advantages will be more fully understood upon reading the following detailed description in conjunction with the accompanying drawings and claims.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figures 1, 1A:
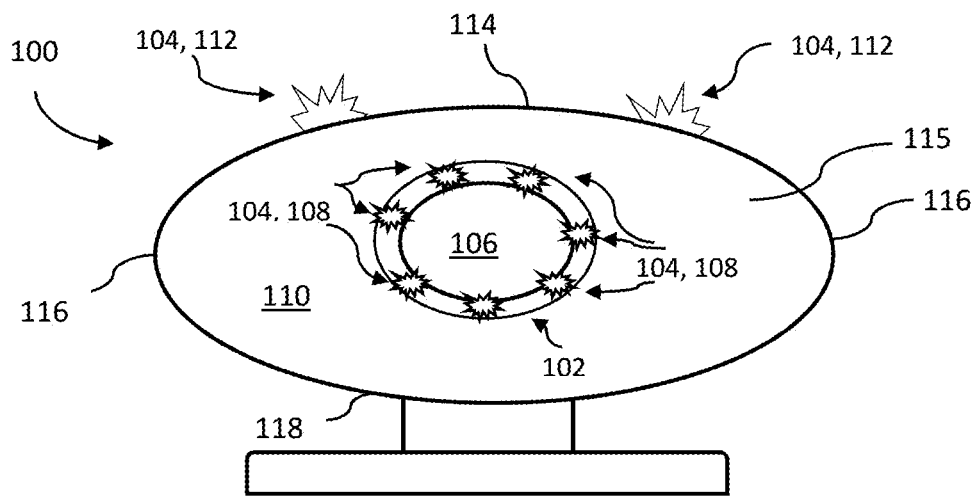
FIG. 1 is a view showing a diagram of a videophone having a camera unit according to an exemplary embodiment.
FIG. 1a is a view showing a diagram of a videophone having a camera unit and a base unit used in connection with a separate video screen according to an exemplary embodiment.

Embodiments of the disclosure will be described herein below with reference to the accompanying drawings. In the description of the drawings, similar reference numerals are used for similar elements. Specific details are given in the description to provide a thorough understanding of the embodiments. However, it will be understood by one of ordinary skill in the art that the embodiments may be practiced without these specific details. Various embodiments described herein may include additional or fewer units, devices, components, modules, etc. than are shown in the figures. Certain processes, structures, and techniques may be shown without unnecessary detail in order to avoid obscuring the embodiments. Likewise, some elements in the accompanying drawings are exaggerated, and each element, size or interval is not necessarily to scale.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in this disclosure should not be interpreted as excluding the embodiments of the disclosure. Additional term usage is described below to assist the reader in understanding the disclosure.

The terms "have," "may have," "include," and "may include" as used herein indicate the presence of corresponding features (for example, elements such as numerical values, functions, operations, or parts), and do not preclude the presence of additional features.

The word "exemplary" is used herein to mean "serving as an example or illustration." Any aspect or design described herein as "exemplary" is not necessarily to be construed as preferred or advantageous over other aspects or designs.

The terms "A or B," "at least one of A and B," "one or more of A and B", or "A and/or B" as used herein include all possible combinations of items enumerated with them. For example, use of these terms, with A and B representing different items, means: (1) including at least one A; (2) including at least one B; or (3) including both at least one A and at least one B. In addition, the articles "a" and "an" as used herein should generally be construed to mean "one or more" unless specified otherwise or clear from the context to be directed to a singular form.

Terms such as "first" and "second" are used herein to distinguish one component from another without limiting the components and do not necessarily reflect importance or an order of use. For example, a first user device and a second user device may indicate different user devices regardless of the order or importance.

It will be understood that, when two or more elements are described as being "coupled", "operatively coupled", "in communication", or "in operable communication" with or to each other, the connection or communication may be direct, or there may be an intervening element between the two or more elements. To the contrary, it will be understood that when two or more elements are described as being "directly" coupled with or to another element or in "direct communication" with or to another element, there is no intervening element between the first two or more elements.

Furthermore, "connections" or "communication" between elements may be, without limitation, wired, wireless, electrical, mechanical, optical, chemical, electrochemical, comparative, by sensing, or in any other way two or more elements interact, communicate, or acknowledge each other. It will further be appreciated that elements may be "connected" with or to each other, or in "communication" with or to each other by way of local or remote processes, local or remote devices or systems, distributed devices or systems, or across local or area networks, telecommunication networks, the Internet, other data communication networks conforming to a variety of protocols, or combinations of any of these. Thus, by way of non-limiting example, units, components, modules, elements, devices and the like may be "connected", or "communicate" with each other locally or remotely by means of a coaxial cable, fiber optic cable, twisted pair, digital subscriber line (DSL), shared chipset or wireless technologies such as infrared, radio, and microwave.

The expression "configured to" as used herein may be used interchangeably with "suitable for," "having the capacity to," "designed to," "adapted to," "made to," or "capable of" according to a context. The term "configured" does not necessarily mean "specifically designed to" in a hardware level. Instead, the expression "apparatus configured to . . ." may mean that the apparatus is "capable of . . ." along with other devices or parts in a certain context.

All or a portion of any embodiment disclosed herein may be utilized with all or a portion of any other embodiment, unless stated otherwise.

Referring now to FIG. 1, a front plan view of a videophone 100 is shown. The videophone 100 includes a camera 102 that in one embodiment is part of a camera unit 115 configured to take video of a user using sign language. The camera 102 may include a lens 106, an image sensor or "imager" (not shown) and an image signal processor (not shown) in operable communication with each other.

The imager is configured to receive light through the lens 106 in the form of waves or particles. The imager may be anything that detects and conveys information used to make an image. The imager includes a plurality of digital photon receptors, or pixels, configured to receive light as an input, which it converts into small bursts of current that convey image information. Said another way, the imager takes photons and turns them into digital signals or values. Each of these bursts of current, digital signals, or outputs, along with metadata and raw data from the imager, and values corresponding to the forgoing, are herein throughout referred to as an "image signal" or "image signals". It will be appreciated by those of skill in the art that these image signals may include, without limitation, information about color or light intensity and other data depending upon the type of imager, the number and configuration of filters or pixels, and the like. The imager may be or include a semiconductor or an integrated circuit or chip. The imager may include a solid-state device or system-on-chip device. In one embodiment, the imager may be a Complementary Metal Oxide Semiconductor (CMOS) device. In another embodiment, the imager may be a Charge-Couple Device (CCD). In yet another embodiment, the imager may be a direct-image sensor such as the FOVEON X3 sensor originally developed by Foveon, Inc. The imager may also be a hybrid of these sensor types or devices. It will be appreciated by those of skill in the art that the imager any device that receives an input related to an image and outputs an image signal. Accordingly, the imager is not an ambient light sensor.

The image signal processor is configured to receive and process an image signal from the imager. The image signal processor processes one or more image signals and outputs a processed image signal. For example, the image signal processor may interpolate image signals and output amplified or full color values to each pixel. The image signal processor may perform other functions, calculations and algorithms that return values related to an image. As used herein throughout, processed image signals may include, without limitation, a color value, a brightness value, a gamma value, a luma value, a gain value, a contrast value, an image noise value, an exposure value, a range value, a signal-to-noise ratio value, an image size value, an image edge value, a sharpness value, a low light performance value, a spatial resolution value, a color imaging fidelity value, a Bayer transformation value, a demosaicing value, a white balance value, a focus value, a lens correction value, a CMOS value, a CCD value, weighted values of any of the foregoing and combinations of any of the forgoing. The Image signal processor may be a digital signal processor. The image signal processor may use parallel computing with different technologies to increase speed and efficiency. In one embodiment, the image signal processor is a system-on-chip with multi-core processor architecture. The image signal processor may also be a discrete processor. The image signal processor and imager may be integrated into one device. The image signal processor may by separate from or share processing duties with, and be integrated with, a camera 302 processor. It will be appreciated by those of skill in the art that in embodiments where the camera hardware and/or software is integrated with the imager, and the imager has its own lens, the imager itself may function as a camera, and there may be no need for an additional camera 102 within the camera unit 115.

The videophone 100 may also include one or more visual indicators 104 configured to allow a user to visually recognize when a call is coming in. The visual indicators may include a light emitters known in the art including without limitation, incandescent light bulbs, halogen bulbs, fluorescent bulbs, light emitting diodes (LEDs) and the like. At least one visual indicator is configured to emit light at a plurality brightness levels.

In one embodiment, the visual indicator 104 is an indicator light 108. The indicator light 108 may be positioned on a front face 110 of the videophone 100 to convey information to a user standing in front of the device. The indicator light 108 may include a plurality of lights positioned in any number of configurations to allow a user to detect an incoming call. For example, in one embodiment, the indicator light 108 is a plurality of lights arranged in a light ring around the camera lens 106. In another embodiment the indicator light 108 may be a plurality of lights that outline the front face 110 of the videophone. In other embodiments, the indicator light may be a plurality of lights arranged in a square or triangle or any other organized or randomly shaped configuration.

The indicator light 108 may also be configured to display one or more of any number of colored lights. In one embodiment, the indicator light 108 conveys information about a call. For example, a particular color or flash pattern of the indicator light 108 may indicate the start, end, or other status of a call. An indicator light 108 color or flash pattern may convey information about who the call is coming from, whether the call is important, whether the call is from an anonymous source, or other call information.

The visual indicator light 104 may also be an area light 112. The area light 112 may provide light to illuminate an area around the videophone 100 when a call comes in or a call status changes. The area light 112 may be positioned on a top surface 114 of the videophone 100, a side surface 116, or a bottom surface 118 of the videophone 100. The area light 112 may be configured to cast a wide angle of light on a wall or ceiling adjacent or near the videophone 100. Area lights 112 on the bottom surface 118 would illuminate the shelf or place below the videophone 100. The area lights 112 allow a user to identify an incoming call even when the user is not positioned in front of the videophone. In one embodiment, the area lights 112 are bright flashers configured to strobe when an incoming videophone call is connected. As with the indicator lights 108, the area lights 112 may be configured to convey information or the status of a call using colors or flash patterns.

The videophone 100 may also be configured with a memory and main processor (not shown). As will be discussed in greater detail below, the memory may store instructions or program code that may be executed by the main processor to perform the functions, features, aspects, algorithms, processes and methods of the videophone 100.

The videophone 100 may be a standalone unit configured to be connected to, or in operable communication with, other devices or components to form a videophone system (see FIG. 1a). It will be appreciated by those of skill in the art, that the videophone 100 may also be configured in a number of configurations and may include additional features, functions, components, modules, or units that are not shown to facilitate the use of the videophone 100 by a user. By way of non-limiting example, these may include a microphone, a speaker, other input/output (I/O) devices, a remote control unit, and the like. The videophone 100 may also include access ports (not shown) to operably connect the videophone 100 to other devices, units or apparatuses. By way of non-limiting example, these ports may include USB ports and HDMI ports.

Referring now to FIG. 1a, videophone is shown in operable communication with a screen 122 or monitor 122 as part of a videophone system 120. In this embodiment, the videophone may include a camera unit 115, which may be the videophone 100 of FIG. 1 with all of its features and functionality, and a base unit 124. In one embodiment, the screen 122 is a separate television set. In another embodiment, the screen 122 may be a computer monitor. The camera unit 115, screen 122, base unit 124, and/or other units of the videophone 100 such as a remote control unit (not shown) or remote visual indicator device (not shown), may communicate or be operatively connected with each other in any number of ways known in the art, including, wirelessly, through a wired connection, through infrared, via wave technologies, using optical technologies, and the like.

The screen 122 may be any medium that can display visual information, including video. The screen 122 is configured to display a user interface 126. As used herein, a user interface 126 includes one or more of a theme, a layout, a screen saver, a background, a color scheme, a display, an image, the look and feel of the screen, other user interface aspects, and the like. The screen may allow a user to interact with the user interface 126 using touch screen technology known in the art or by point and click devices or other devices.

The base unit 124 may include navigation buttons 128 to assist a user in navigating the user interface 126 and other features or devices of the videophone system 120. In this embodiment, the video phone includes memory (not shown) for storing instructions and a main processor (not shown) for executing instructions, each of which may be contained in the camera unit 115 and/or the base unit 124. The main processor and memory are operatively connected to each other and may be in operable communication with an imager (not shown) and image signal processor (not shown) of the camera unit 115 and the visual indicators 104. The memory and main processor will be described in greater detail below.

It will be appreciated that a videophone system 120 may include other features, functions, devices, or units to allow a user to communicate with a call recipient through the videophone system 120. These may include, without limitation, microphones, speakers, separate touchpads, hand held apparatuses, other I/O devices, a remote control unit, a port and the like. These features, functions, devices and units are omitted from the Figures for clarity in describing the embodiments.

Figure 2:
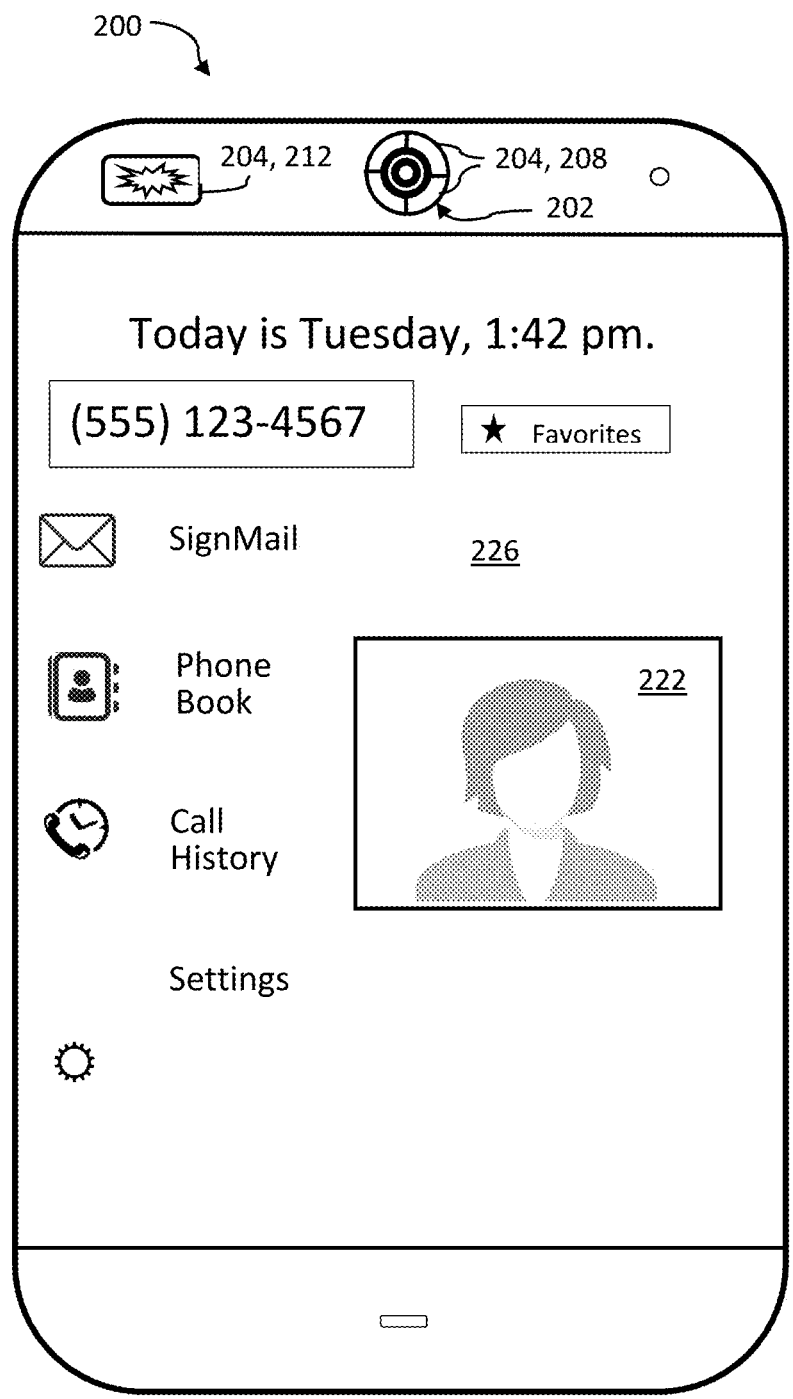
FIG. 2 is a view showing a diagram of a videophone with an integrated video screen according to an exemplary embodiment.

Referring now to FIG. 2, another embodiment of a videophone 200 is shown. This videophone 200 may be a mobile device 200 that has an integrated screen 222. The videophone 200 includes a camera 202 and one or more visual indicators 204 to allow a user to recognize when a call is coming in. The camera 202 may include a lens 206 and is configured to take video of a user using sign language. The camera may also include an imager (not shown) and an image signal processor (not shown), which may be of the kind described above in connection with FIG. 1. The visual indicator 204 may be an indicator light 208 or an area light 212. In one embodiment, one of the indicator light 208 or area light 212 is the camera flash of the device 200.

The screen 222 may be configured to display a user interface 226. It will be appreciated by those of skill in the art that the screen 222, and by extension the user interface 226, emits light and may also be a visual indicator 204. Herein throughout, the terms user interface and screen may be used interchangeably. Accordingly, in one embodiment, the visual indicator 204 may one or more of an indicator light 208, and area light 212 and a user interface 226. The videophone 200 may be configured with other features, functions, devices, or units to facilitate the use of the videophone 200 by a user. These may include without limitation a microphone, speaker, other input/output (I/O) devices, ports, a remote control unit, and the like. These other features, functions, devices and units are not shown for clarity.

The videophone 200 includes memory and a main processor (not shown) in operable communication with the visual indicator 204, the imager and/or the image signal processor of the camera 202. In one embodiment, the videophone 200 is configured to operate as a standalone device. In another embodiment the videophone 200 is configured to be operatively connected to other videophone devices or components such as the base unit of FIG. 1a. For example, a user may use the integrated screen of the videophone 200 while away from home, but desire a bigger screen for use while in the home. With the videophone 200 operatively connected to a home base unit, it could utilize a home television or computer monitor to display a user interface 226 instead of, or in addition to, the smaller screen 222 of the mobile device 200. In this configuration, the videophone 200 may have access to other components of a home videophone system such as navigation controls, keyboards, other I/O devices, and the like, which may be more convenient to use at home than similar components found on the mobile device 200. It will be appreciated by those skilled in the art that when the videophone 200 is not used as a standalone device, but rather as a component in a home videophone system such as the one described in connection with FIG. 1a, that the videophone 200 may take the place of a component such as the camera unit 115 (see FIG. 1a).

Figure 3:
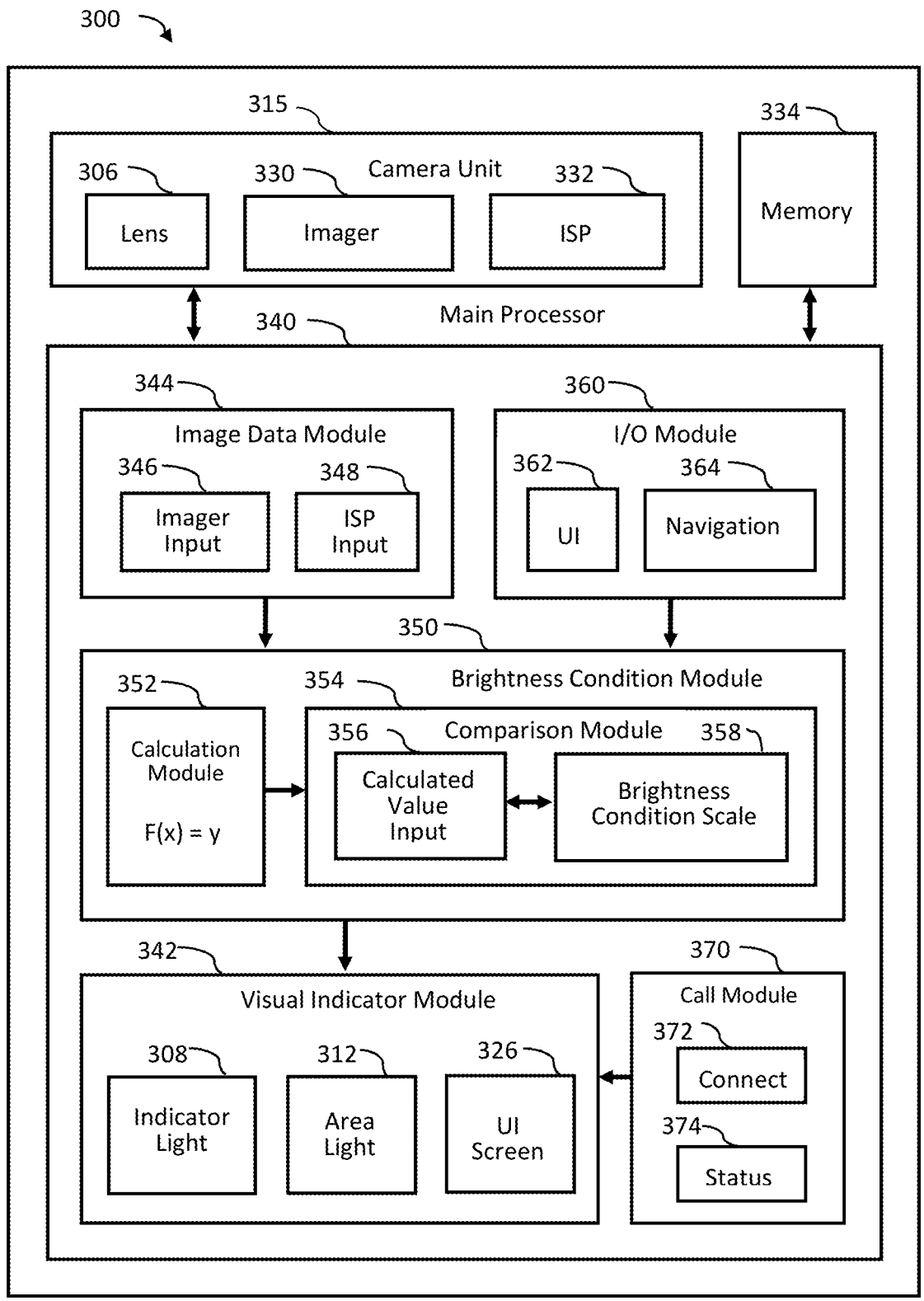
FIG. 3 is a block diagram representation of an example showing videophone components for implementing various embodiments of the disclosure according to an exemplary embodiment.

Referring now to FIG. 3, a schematic view of one embodiment of a videophone 300 is described. In one embodiment, the videophone 300 includes components such as a camera unit 315 that may include a lens 306, an imager 330 and an image signal processor 332. These components or units may be of the kind described in connection with FIGS. 1, 1a and 2. The videophone 300 also may include visual indicators 308, 312 and 326 of the kind described in connection with FIGS. 1, 1a and 2.

The videophone 300 includes memory 334. The memory 334 in this embodiment and other embodiments described herein is configured to store instructions for executing functions or operations associated with a videophone or video phone system and its components, modules, or units. The memory 334 can store, transmit, and/or receive data or information related to the camera 302, imager 330, image signal processor 332 or any other components, modules or units of the videophone 300. The memory may store and use information for controlling the brightness level of one or more visual indicators 308, 312 and 326. Memory 334 can additionally store protocols and/or algorithms associated with estimating, calculating and/or comparing a brightness condition of an area.

It will be appreciated that the memory 334 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 334 is intended to comprise, without being limited to, these and any other suitable types of memory. The memory 334 described in connection with this embodiment may also be the memory used in other embodiments described in this specification.

The videophone 300 may also include a main processor 340 operatively coupled with the memory 334 and configured to execute the instructions to perform operations to control the videophone 300. The main processor 340 may be one or more processors operatively coupled to the memory 334, such that the one or more processors can read information from and write information to the memory 334. The main processor 340 may be in operable communication with the camera unit 315, and the imager 330 and/or the image signal processor 332. It will be appreciated by those of skill in the art that the main processor 340 may communicate with the imager 330 directly, or through the image signal processor 332. The main processor 340 may also be in operable communication with the visual indicators 308, 312 and 326. The main processor 340 may reside within the camera unit 315, base unit or elsewhere in the video phone.

In some embodiments, the image signal processor 332 and the main processor 340 are the same processor. That is, in some embodiments the functions of the image signal processor and the main processor may be combined. This combined processor may work in conjunction with other processors, or alone to execute instructions to perform the operations described herein. Accordingly, all references herein throughout to any processor may include the image signal processor or the main processor or an integrated processor that may perform the functions of both a main processor and the image signal processor. Further, references herein throughout to the image signal processor should be read to include the main processor and vice versa.

Furthermore, it will be appreciated by those of skill in the art that the processor or processors that implement or perform the various illustrative devices, systems, modules, units, components, features, functions, aspects, algorithms, methods and processes described in connection with the embodiments disclosed herein may be, and include without limitation, a general-purpose processor, a digital signal processor (DSP), a dedicated processor (e.g., an embedded processor), a generic-purpose processor (e.g., a central processing unit (CPU), an application processor (AP), an application specific integrated circuit (ASIC), a field programmable gate array (FPGA) or other programmable logic device, a discrete gate or transistor logic, discrete hardware components, a microprocessor, any conventional processor, controller, microcontroller, state machine, or any combination thereof.

Thus, the processor or processors referenced herein may be implemented as a combination of computing devices, for example, a combination of a DSP and a microprocessor, a plurality of microprocessors, one or more microprocessors in conjunction with a DSP core, or any other such configuration. In some aspects, one or more processors and the memory may be integral with each other. The one or more processors and the memory may reside in an ASIC. Additionally, the ASIC may reside in a user terminal or unit. In the alternative, the processors and the memory may reside as discrete components in a user terminal or unit.

Finally, the processor or processors may include one or more modules configured to execute instructions to implement or perform the various illustrative devices, systems, modules, units, components, functions, features, aspects, algorithms, methods and processes described in connection with the embodiments disclosed herein. It will be appreciated that the modules described herein are exemplary for the purpose of describing features of the present invention and should not be read to be limiting of its scope. It will be appreciated that the processor 340 or processors 340, and associated modules, may be configured or programmed in several ways to accomplish the teachings of the embodiments disclosed herein.

In one embodiment, the main processor 340 includes a visual indicator module 342, an image data module 344, a brightness condition module 350, a calculation module 352, a comparison modules 358, an I/O module 360 and a call module 370.

The visual indicator module 342 may be configured to control the brightness level of an indicator light 308, an area light 312 and a user interface 326. In one embodiment, each of the indicator light 308, the area light 312 and the user interface 326 are configured to have a plurality brightness levels, that may or may not be the same brightness levels as the other visual indicators, 308, 312 and 326. In another embodiment, one or more of the visual indicators 308, 312 and 326 has a high brightness level, a medium brightness level and a low brightness level. In yet another embodiment, one or more of the visual indicators 308, 312 and 326 may have fourth brightness level corresponding to an auto dim feature of the videophone 300 that may be used after a predetermined period of nonuse. In yet other embodiments, one of more of the visual indicators 308, 312 and 326 may have a brightness level corresponding to a night mode feature of the videophone 300. In one embodiment, each of the visual indicators 308, 312 and 326 has a light emitter or light source that can be controlled to increase or decrease the brightness level of the visual indicators 308, 312, or 326, or in other words, emit light at a plurality of brightness levels. The brightness levels may correspond to a brightness condition of an area in which the imager 330 is located. A brightness condition value may be received from the brightness condition module 360 to determine what level of brightness each visual indicator 308, 312 and 326 should emit.

In one embodiment, the visual indicator module 342 the brightness level of at least one of the indicator light 308 and the area light 312 is adjusted or controlled using pulse-width modulation. The visual indicator module 342 may include, or be in operable communication with a microcontroller (not shown) and the pulse-width modulation provides the ability to simulate varying levels of power by oscillating an output from the microcontroller.

The visual indicator module 342 may control the brightness level of the user interface visual indicator 326 by using layering techniques. A layer may be applied over the user interface 326, or aspects thereof, to alter the opacity of the use interface 326. For example, in one embodiment, an applied layer may make certain screen elements darker to reduce the brightness of the user interface 326. In another embodiment, a graphic may be overlaid on the screen to reduce the brightness and/or change the color cast of the screen, and thus the user interface 326. One or more layers may be applied to the screen or user interface 326 to affect the opacity of screen elements, making the screen and by extension the user interface 326 appear darker. In one embodiment if the visual indicator module 342 sets a brightness level for the user interface to high, then no layers may need to be used. The maximum amount of light may be allowed to shine through the user interface 326. This amount may be determined by the hardware or power of any light emitter used to illuminate the screen. It will be appreciated that a user may choose or change a setting to one or more previously determined themes, backgrounds, color schemes and the like. Each of these user interface elements may emit light at different levels than other user interface elements due to color schemes used in the theme or the density of colors used in the background, etc. Accordingly, it will be understand that different layers may need to be used and different adjustments may need to be made to illuminate the user interface at a particular setting or level, depending on the theme, background, scheme, or other user interface element chosen by the user. For example, a medium setting of a "Sand Dune" theme may be illuminated at sixty percent of the high setting for this theme, whereas the medium setting of a "Contrast" theme may need to be illuminated at seventy percent of the high setting for this theme in order to approximate the medium setting of the Sand Dune theme. Similarly, a low setting of the Sand Dune theme may only need to be illuminated at twenty-five percent of its high value to approximate a low setting of the Contrast theme, which is illuminated at forty percent of its high value at a low setting.

In one embodiment, the brightness of the visual indicators 308, 312, and 326 is reduced by varying the power which is sent to the LEDs or other light emitters of the visual indicators 308, 312, and 326. It will be appreciated by those of skill in the art that in embodiments where the visual indicator is a digital device operatively coupled with a microcontroller, a Digital to Analogue Converter (DAC) may need to be used to vary the power.

The processor 340 of the videophone 300 may include an image data module 344. The image data module 344 is configured to receive an imager input 346, an image signal processor input 348 or both. These inputs may be received directly or indirectly from the imager 330 or the image signal processor 332. For example, the imager input 346 may come directly from the imager 330 or indirectly through the image signal processor 332. In other words, in embodiments, where the processor 340 uses just image signals for its brightness condition determinations, those image signals may come directly from the imager, or may be passed through the image signal processor without being processed. The imager input 346 and the image signal processor input 348 may be values corresponding to an image signal and/or a processed image signal. Accordingly, the processor 340 is configured to execute instructions and perform operations to receive at least one value corresponding to at least one of an image signal and a processed image signal from one or both of the of the imager 330 and the image signal processor 332. In one embodiment, the image data module 344 receives a luma value, a gain value and an exposure value from the image signal processor 332. In another embodiment the image date module receives a weight variant of the luma value, the gain value and the exposure value.

The processor 340 of the videophone 300 may include a calculation module 352 to allow the processor to use at least one value corresponding to at least one of an image signal and a processed image signal to determine a brightness condition of an area in which the imager is located. The calculation module 352 may convert at least one value corresponding to at least one of an image signal and a processed image signal to a calculated value according to the following formula:

$$F(x)=y \tag{1}$$

where "F(x)" is some combination of image signal values and processed image signal values and "y" is the calculated value. In one embodiment, converting the at least one value corresponding to at least one of an image signal and a processed image signal includes dividing the product of two or more values corresponding to processed image signals by a single value corresponding to a processed image signal. In another embodiment, a luma value is divided by the product of a gain value and an exposure value to create the calculated value. In another embodiment, the calculation module 352 of the processor 340 divides a weighted mean luma value by the product of a weighted gain value and a weighed exposure value to achieve a calculated value according to the formula:

$$\text{calculated value}=(a*\text{mean luma value})/(b*\text{gain value}*c*\text{exposure value}); \tag{2}$$

where a, b, and c are real numbers between 0.001 and 100. It will be appreciated that a, b, and c are weighting factors that allow for the adjustment of how each of these processed image values contribute to the calculated value. It will further be appreciated that when a, b or c are equal to 1, the corresponding luma value, gain value and exposure value are not weighted. In some embodiments, the weighted values allow the range of resulting calculated values to be adjusted to better correlate the scale to an actual brightness condition. This may be desired depending upon a number of factors, including, for example, the different lens 306 in the camera unit 315 that may cause the image signal values and/or processed image signal values to change. It may be desirous to normalize a range of calculated values using various values of a, b, and c so that it may be better correlated to actual brightness condition.

The processor 340 may include a brightness condition module 350. In one embodiment, the brightness condition module 350 includes a calculated value input 356 and a brightness condition scale 358. The brightness condition module 350 may be configured to associate a calculated value input 356 from the calculation module 352 with a corresponding point on the brightness condition scale 358. Accordingly, the calculated value may also be referred to herein as a brightness condition scale value. In one embodiment, the calculated values are mapped to a brightness condition scale 358 that may approximate the actual brightness condition possibilities in an area. In another embodiment, the brightness condition scale 358 is defined by a range of calculated values. Accordingly, the brightness condition scale 358 may be defined by all the possible calculated values "y" in formula (1) or by a subset of all the possible calculated values.

As will be discussed in further detail below in connection with FIG. 6, the brightness condition scale 358 may include a plurality of subranges. Each subrange may correspond with a brightness condition of an area or space in which the imager 330 is located. By comparing the point on the brightness condition scale 358, correlating to a calculated value, with the subranges of the brightness condition scale, the processor 340 can assign or determine a brightness condition of the area. For example, in one embodiment, the brightness condition scale may correspond to a range of lux values normalized to values between 0 and 100. This brightness condition scale may have subranges from 0 to 30, 31 to 70 and 71 to 100. The 0 to 30 subrange may be associated with a low brightness condition. The 31 to 70 subrange may be associated with a medium brightness condition. The 71 to 100 subrange may be associated with a high brightness condition. At any given time, the calculation module 352 may use various image signal values and/or processed image signal values from one or more the imager 330 and image signal processor 332 in an equation (1) to derive a calculated value between 0 and 100. Because the calculated value corresponds to a point on the brightness scale, that point can be compared to the brightness scale subranges, to determine the subrange in which the point falls, and thus, the brightness condition of the area. The determined brightness condition may be passed to the visual indicator module 342 as a value or parameter and used by the visual indicator module 342 to set the visual indicator, and any one or more of the indicator light, the area light, and the user interface, to emit light at a brightness level corresponding to the determined brightness condition.

In other embodiments, different combinations of image signal values and/or processed image signal values are used to find a range of calculated values that can be correlated to, or become, a brightness condition scale 358. As will be discussed in detail below, the inputs to the calculation module may be predetermined based on how well the range of calculated values approximates an actual brightness condition. This determination may be made by providing various levels of light to a room in which an imager is located. Those various levels could be measured by a lux meter and a calculated value could be determined at the various levels. If a combination of image signal values and/or processed image signal values do not yield calculated values which correlate to actual brightness conditions, as confirmed by the lux meter, then a different combination of image signal values and/or processed imaged signal values should be use. If a combination of image signal values and/or processed image signal values do does correlate to actual brightness conditions, as confirmed by the lux meter, then a range of the calculated values may be used as the brightness condition scale 358 and subsequent calculated values, based on current image signals and/or processed image signals, can be compared to the scale 358 to determine a brightness condition.

The processor 340 may also include an I/O module 360 to facilitate receiving and input from, or providing an output to, a user. In one embodiment the I/O module 360 may direct the input from, and output to, a user. By way of non-limiting example, inputs may be received by the use of a touch screen, a navigation or toggle button on base unit or other part of the videophone 300, a keyboard, a point and click device, a remote control unit, a microphone and the like. Output devices may include screens, speakers, lights, the visual indicators, and the like.

The I/O module 360 may include a user interface module 362. The user interface module 362 may allow a user to use the user interface to select a setting, chose an option, or initiate a process. By way of non-limiting example, the user interface module 362 may allow a user to choose a brightness level, turn on an auto brightness mode, select a theme or a layout for where information appears on a screen, select a screen saver, background, or user interface color scheme, and the like. The I/O module 360 may include a navigation module 364 to facilitate the navigation of the user interface 326. By way of non-limiting example, the navigation module 364 module may allow a user to use one or more of the various input devices discussed above to display a particular user interface screen or panel, to open or close an information window, move to particular information page, select an option, or otherwise navigate, select, or control various features and functions and units of the videophone 300. Inputs received through the I/O module may then be directed to the appropriate module to carry out the user selection.

The processor 340 may also include a call module 370. In one embodiment, the call module 370 is configured to establish a telephonic connection. The call module 370 may determine a status of a call, including without limitation, a call connection, a call termination, and call disconnections, a left voice or signmail or other message, a missed call, a held call, and the like. The call status may trigger illumination of one or more visual indicators at a chosen or determined brightness level.

It will be appreciated that the processor 340 may configured with other modules to control other features, functions, components, units, methods processes, aspects or algorithms of the videophone 300 that are not shown for clarity.

Figure 4:
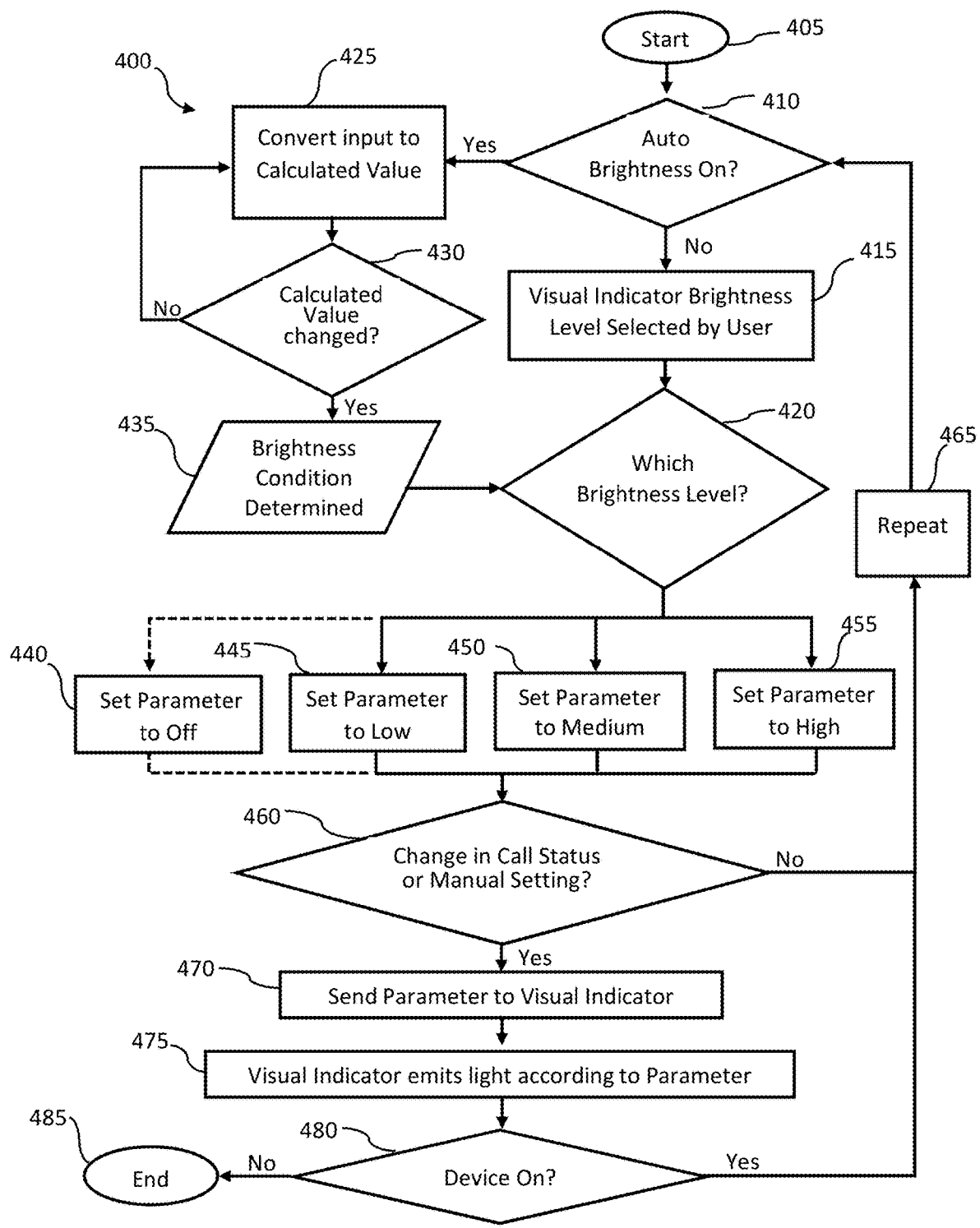
FIG. 4 is a flowchart showing a process to control a brightness level of a videophone visual indicator according to an exemplary embodiment.

Turning now to FIG. 4, a flow chart 400 showing one embodiment of operation steps that may be executed by the processor or processors to control the brightness of the indicator light and/or area light visual indicators. At the start 405, the brightness setting for the visual indicator is set. It will be appreciated that this may happen initially at a manufacturer's facility. It may also happen at any time by a user. The processor may determine 410 whether an auto brightness mode is in an "on" position. If not, the visual indicator brightness level setting may be manually selected 415 by a user. In one embodiment, this may be done using a user interface settings page for the area light and/or the indicator light. The selected brightness level is then determined 420.

If the auto brightness mode is in an "on" position, a calculated or brightness condition scale value is determined 425 using inputs from the imager and/or image signal processor. Once a brightness condition scale value is determined, the processor determines whether there had been a change in the brightness condition scale value 430. If a change in the brightness condition scale value has occurred, a current brightness condition is determined 435. If a brightness condition scale value has not changed, steps 425 and 430 are repeated until there is a change in the brightness condition scale value. As will be discussed in greater detail in connection with FIG. 6 below, the brightness condition determination at step 435 may be accomplished by comparing the calculated value or brightness condition scale value to a subrange of the brightness condition scale. A brightness level corresponding to a brightness condition is determined 420. Accordingly, step 420 may use either a user/factory default setting received from the imager and/or the image signal processor to determine a brightness level setting.

Brightness parameters or values may be set and/or stored corresponding to the brightness level setting. In one embodiment, the brightness parameters may be set to an off value 440. In one embodiment, this may allow only the area lights to flash. The video indicator may be set to a low value 445. At this setting, power adjustment or pulse-width modulation may be used to dim one or more the area light and the indicator light, or to simulate the dimness level. The video indicator may be set to a medium value 450. At this setting, power adjustment or pulse-width modulation may be used to dim one or more the area light and the indicator light to a level that is not quite as low as the dimness level of the low value, or to simulate such a dimness level. The video indicator may be set to a high value 455. At this setting, the maximum amount of light that the visual indicator is capable of producing may be used. It will be appreciated that any number of brightness level settings may be used. It will further be appreciated that default brightness level settings may be used in certain conditions. By way of non-limiting example, in incoming emergency call or other event may cause the area and/or indicator lights to illuminate at a brightness level setting regardless of a manually chosen setting 415 or a brightness level setting associated with a determined brightness condition 425, 430, and 435.

A call status change or a change in the manual brightness level setting may be detected 460. If no change in a call status or manual brightness level setting is detected, the prior process steps may be repeated 465 until such a change occurs. In this embodiment, the main processor may continuously receive at least one value corresponding to at least one of an image signal and a processed image signal from the imager and/or image signal processor when the automatic brightness mode is in an on position.

When a change in the call status, a change in the manual brightness level setting, or a change in some default condition occurs, the video indicator may be set to emit light at a brightness level corresponding to the determined brightness condition or a stored setting. The visual indicator setting may be accomplished by sending 470 a value corresponding to one of steps 440, 445, 450 and 455 to the visual indicator. The visual indicator emits light according to the brightness level setting 475. If the visual indicator was triggered by a change in the manual settings or a change in a call status when the auto brightness mode is not in an "on" position, the visual indicator emits light corresponding to the manual brightness level setting. For example, if a user turns off the "auto brightness" mode and changes the manual setting to a particular brightness level, that level may immediately be reflected by illuminating the area and/or indicator lights at the corresponding brightness level as a confirmation to the user that the change was made. If the visual indicator was triggered by a change in the call status, and the auto brightness mode is on, the visual indicator may emit light corresponding to the brightness level setting associated with a determined brightness condition. As mentioned above, a change in a call status may include the detection of an incoming call, a call connection, a call disconnection, a call termination, a call hold, a message left, and the like. Thus, in one embodiment, the processor executes instructions and/or performs operations including setting the video indicator to emit light at a brightness level corresponding to the determined brightness condition. It will be appreciated by those skilled in the art that setting the visual indicator to emit light at a brightness level corresponding to the determined brightness condition may include storing a value or parameter associated with a brightness level, sending a value or parameter associated with a brightness level, or a combination of these at a given time or at multiple times. Indeed, setting the video indicator light may include one or more of steps 420 to 475.

In one embodiment, videophone may be configured to override a chosen 415 or determined 435 brightness level setting, value, or parameter under certain conditions. Thus in certain embodiments, regardless of the chosen or determined brightness level setting, various combinations of brightness level settings may be used with various combinations of call statuses and various types of call information. For example, even if a low brightness condition is determined, an incoming call status may cause the area lights to emit light at a low light level, while the indicator light might illuminate at a medium or high level. This may be advantageous if a "cool" color such as blue is used as an indicator light for a call from a particular person. The blue light may not illuminate as brightly as a yellow light, for example, at a low brightness level setting.

If it is determined 480 that the videophone is still on, the previous process steps may be repeated 465. Otherwise, the process may end 485.

Figure 5:
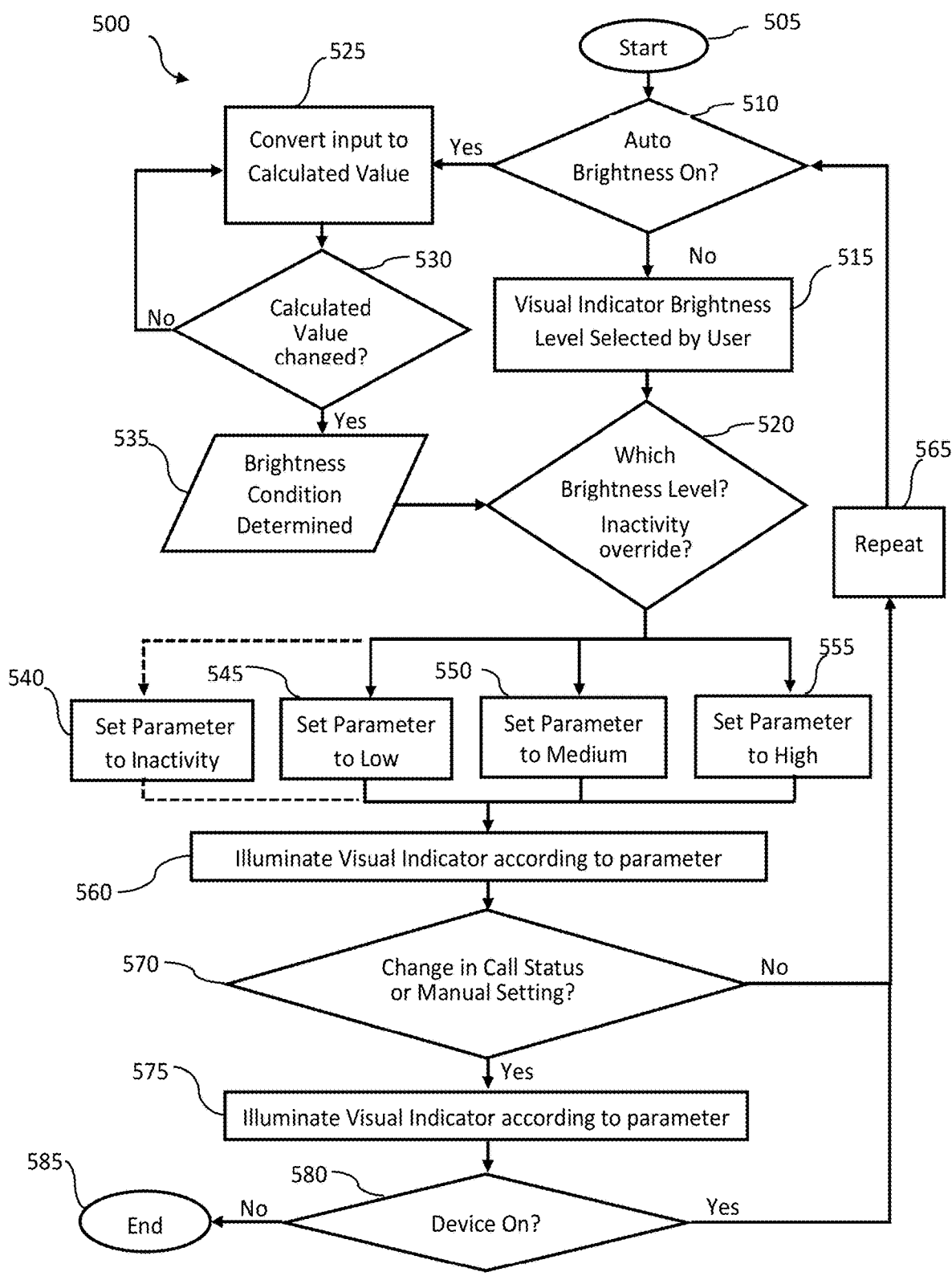
FIG. 5 is a flowchart showing a process to control a brightness level of another videophone visual indicator according to an exemplary embodiment.

Turning now to FIG. 5, a flow chart 500 showing one embodiment of operation steps that may be executed by the processor to control the brightness of the user interface visual indicator is shown. At the start 505, the brightness setting for the visual indicator is set. It will be appreciated that this may happen initially at a manufacturer's facility. It may also happen at any time by a user. The processor may determine 510 whether an auto brightness mode is in an "on" position. If not, the visual indicator brightness level setting is manually selected 515 by a user using the user interface, or as a factory default setting. The brightness level is determined 520.

If the auto brightness mode is in an "on" position, a brightness condition scale value is determined 525 using inputs from the imager and/or image signal processor. Once a brightness condition scale value is determined, the processor determines whether there has been a change in the brightness condition scale value 530. If a change in the brightness condition scale value has occurred, a current brightness condition is determined 535. If a brightness condition scale value has not changed, steps 525 and 530 are repeated until there is a change in the brightness condition scale value. A brightness level corresponding to a brightness condition is determined 520 and an inactivity override is determined 520. If an inactivity auto dimmer is set to an "on" position and a predetermined inactivity time has elapsed, then a brightness parameter or value may be set and/or stored 545 to an inactivity brightness level. If an inactivity auto dimmer is set to an "off" position or an inactivity auto dimmer is set to an "on" position but predetermined inactivity time has not elapsed, then a brightness parameter or value may be set and/or stored to a low 550, medium 555, or high 560 brightness level. These brightness level settings 545, 550, 555, and 560 may allow the user interface to illuminate at varying degrees of brightness by using layering or opacity control as described in connection with FIG. 3. Although only for levels of brightness setting are illustrated, it will be appreciated that any number of brightness level settings may be used.

When a brightness level setting is manually chosen 515, or determined according to a brightness condition of the area in which the imager is located 525, 530 and 535, or determined according to a default condition such an inactivity condition 540, the user interface is illuminated according to a brightness level value or parameter.

A change in a call status, a manual change in a user setting, or a change in a device activity or inactivity level may be detected 570 by the processor. If no change no change is detected, the previous process steps may be repeated 565 until a change is detected. If a change in a call status, a manual change in a user setting, or a change in an activity or inactivity level is determined 570, a new brightness level setting value or parameter is set or stored and the appropriate value is sent to the visual indicator 585 and to the user interface to emit light 575 at the appropriate level. For example, if a user turns off the "auto brightness" mode and manually chooses a particular brightness level setting, that level may immediately be reflected by illuminating the user interface at the corresponding brightness level to confirm to the user that the setting was changed. In another illustrative example, the touch of a touchscreen may indicate the end of an inactivity period and the user interface may stop illuminating at an "inactivity" brightness level and start illuminating at a brightness level corresponding to a manually chosen setting 515 or brightness level corresponding to a determined brightness condition 525, 530, and 535. By way of further non-limiting example, a change in call status, such as an incoming call, may cause to user interface to illuminate at a chosen or determined brightness level, or a predetermined override level. In one embodiment, an incoming call will cause the user interface to illuminate at a high brightness level setting regardless of the chosen or determined brightness level setting.

It will be appreciated that the processor may be configured to override a chosen, determined, or default brightness level setting, value or parameter under certain conditions. Thus, it will be appreciated that regardless of the chosen, determined, or default brightness level setting, various combinations of brightness level settings may be used with various combinations of call statuses and various types of call information. For example, even if a low brightness condition is determined, an incoming call status may cause certain aspects of the user interface, such as for example the theme to illuminate at a high light level while a background, and/or other user interface aspects are illuminated according to the chosen, determined or default brightness level setting. This may allow data such as the incoming phone number to be illuminated at a brighter level when a call is incoming, while leaving other aspects of the user interface at a lower light emission level.

In one embodiment, the emission of light at a chosen, determined, or override brightness level may last for a specific duration of time or until a new call status is detected, such as, for example, a call termination or disconnection. At which point, the user interface may return to a manually chosen brightness level setting, a determined brightness level setting corresponding to a brightness condition, a predetermined default brightness condition, such as for example, a default condition associated with a period of inactivity.

If it is determined 580 that the videophone is still on, the previous process steps may be repeated 465. Otherwise, the process may end 590.

Figure 6:
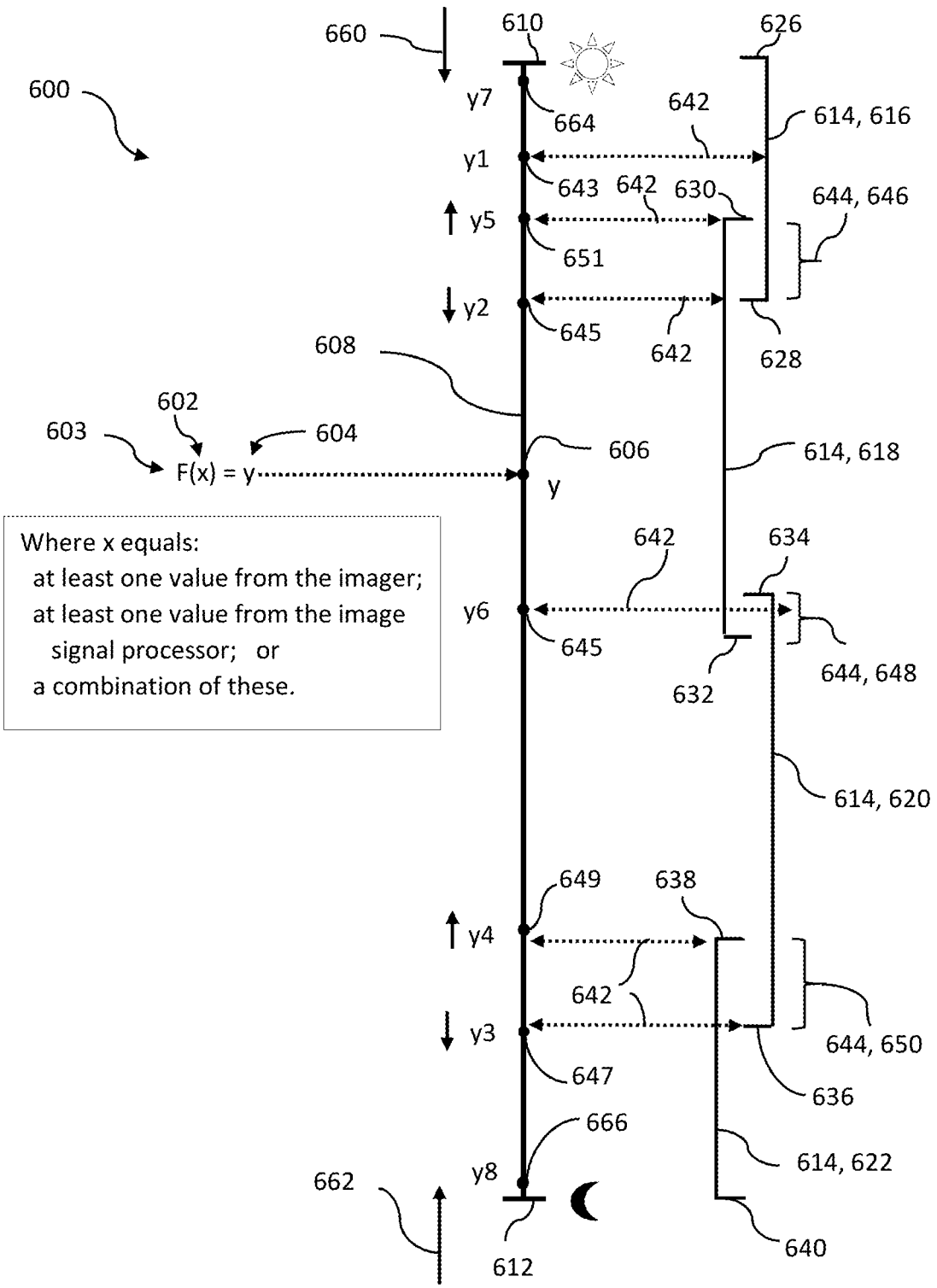
FIG. 6 is a view showing a process of determining a brightness condition of area using imager and/or image signal processor outputs according to an exemplary embodiment.

Referring now to FIG. 6, an illustrative example of one embodiment for determining a brightness condition is shown. It will be appreciated that this determination may correspond to operation steps 425, 430, 435 and 465 of flow chart 400 (see FIG. 4) and operation steps 525, 530, 535 and 580 of flow chart 500 (see FIG. 5). In one embodiment of illustrative example 600, the processor may convert at least one value "x" 602 to a calculated value "y" 604 using the function "F(x)" 603. The value "x" 602 may be one or more of a value corresponding to an image signal and a value corresponding to a processed image signal. Accordingly, "x" 602 may be a value corresponding to raw data from the imager. In one embodiment, "x" 602 may be a value corresponding to color position or intensity data. In another embodiment, "x" 602 may be a value corresponding to imager meta data. The value of x" might also be one or more values associated with one or more processed image signals. As previously mentioned, a processed image signal may be a value corresponding to one or more of a color value, a brightness value, a gamma value, a luma value, a gain value, a contrast value, a noise value, an exposure value, a range value, a signal-to-noise ratio value, an image size value, an image edge value, a sharpness value, a low light performance value, a spatial resolution value, a color imaging fidelity value, a Bayer transformation value, a demosaicing value, a white balance value, a focus value, a lens correction value, a CMOS value, a CCD value, weighted values of each of the foregoing and combinations of each of the forgoing, either alone or in combination.

The calculated value or brightness condition scale value "y" 604 corresponds to a point 606 on a brightness condition scale 608. In one embodiment, the brightness condition scale 608 represents a range of calculated values "y". The brightness condition scale 608 may correspond to a brightness condition of an area in which the imager is located. For example, one end 610 of the brightness condition scale 608 may correspond to a very bright condition of the area in which the imager is located and the other end 612 of the brightness condition scale 608 may correspond to a dark condition of the area in which the image is located. It will be appreciated the brightness condition is determined for the area where the imager is located because imager and/or image signal processor values are used to determine the brightness condition.

In one embodiment, the brightness condition scale 608 includes at least two subranges 614. Each subrange 614 corresponds to a particular brightness condition. In another embodiment, the brightness condition scale 608 corresponds to, or is made up of four subranges 614, each subrange corresponding to a brightness condition. For example the subrange 616 may correspond to a high brightness condition. The subrange 618 may correspond to a medium brightness condition. The subrange 620 may correspond to a low brightness condition and the subrange 622 may correspond to a very low brightness condition. It will be appreciated that the in one embodiment, the subrange 622 may also be used as the default condition when an auto dimness setting is an "on" position and a period of inactivity has occurred. For example, in certain embodiments, a brightness level setting corresponding to the subrange 622 may be used to illuminate aspects of the user interface after a predetermine period of inactivity. It will be appreciated that any number of subranges may be used.

Each subrange may be defined by two ends. For example, subrange 616 may be defined by a high end 626 or threshold 626 and a low end or threshold 628. Subrange 618 may be defined by a high end 630 or threshold 630 and a low end 632 or threshold 632. Subrange 620 may be defined by a high end 634 or threshold 634 and a low end 636 or threshold 636. Subrange 622 may be defined by a high end 638 or threshold 638 and a low end 640 or threshold 640. In one embodiment, the combination of subranges 616, 618, 620, and 622 are configured to encompass all of the points or values on the brightness condition scale 608. Thus, it will be appreciated that the combination of subranges 614 encompass all the possible brightness conditions represented by the brightness condition scale and any point on the brightness condition scale can be compared 642 to a subrange 614 to determine a brightness condition of an area in which the imager is located. For example, one or more image signal or processed image signal values "x" 602 could be converted into calculated value y1 corresponding to point 643. Point 643 could be compared 642 to the subranges 614 and be found to lie within the subrange 616, corresponding to a high brightness condition.

As a brightness condition of the area in which the imager is located changes, the values associated with image signals output by the imager change. Consequently, values associated with processed image signals change. Accordingly, the calculated value "y", based on image signals and processed image signals, changes. The brightness condition scale 608 corresponds to a range of "y" values. In one embodiment, the scale 608 is arranged such that higher values correlated to higher brightness conditions and lower values correlate to lower brightness conditions. It will be appreciated that the use of certain image signal and processed image signal inputs may generated calculated values such that lower "y" values correlate to higher brightness conditions and vice versa. In the illustrated embodiment, as subsequent calculated values decrease along the brightness condition scale 608, the current calculated value may no longer compare or correspond to the same subrange 614, but may now correspond to an adjacent subrange 614 corresponding to a lower brightness condition of the area. This newly determined brightness condition is associated with a brightness condition level setting that may be used by one or more of the visual indicators to emit light at a new brightness level. For example, a calculated value may be y1 corresponding to point 643 in the high brightness condition subrange 616. As the image signal and processed image signal values reflect a lower light condition in an area, the calculated value y decreases. At some point, a subsequent calculated value y2 associated with point 645 on the brightness condition scale may be lower than the low threshold 628 value of subrange 616 and may now correlate or be compared to the middle brightness condition subrange 618. A new brightness condition level setting may be used by the visual indicators to emit light or illuminate at the lower brightness level. Over the course of time, calculated values may decrease through various subranges until the calculated value is y3 associated with point 647, having decreased past the low threshold 636 of the low subrange 620 and now corresponds to the lowest subrange 622 associated with the lowest brightness condition.

Conversely, if the imager and/or image signal processer returned values such that the calculated value was y3 associated with 647, and subsequently returned values such that the calculated value was y4 associated with point 649, the calculated values would have moved up the brightness condition scale. The calculated value y4 would have passed the upper threshold of 638 of the very low brightness condition subrange 622 and now correspond or be compared to the low subrange 620. A corresponding new brightness condition level setting could now be used by one or more of the visual indicators which could emit light more brightly than the previous brightness condition level setting. The calculated value could increase, moving past the upper thresholds of adjacent subranges and eventually a calculated value y5 associated the point or value 651 would be past the upper threshold 630 of the medium brightness condition threshold and trigger a change in brightness level condition setting corresponding to the high brightness condition subrange 616. Thus is can be seen that the output from the imager and/or image signal processor can be used to determine the brightness condition of an area using only the imager without the use of an ambient light sensor.

In one embodiment, at least one of the subranges 614 of the brightness condition scale 608 overlaps with an adjacent subrange 614 to create an overlapping region 644. In another embodiment, all of the subranges 614 overlap with an adjacent subrange 614, except for the highest and lowest subranges 616 and 620 respectively. Overlapping region 646 is defined by the low threshold 628 of the high brightness subrange 616 and the high threshold 630 of the medium brightness subrange 618. Similarly, overlapping region 648 is defined by the low threshold 632 of the medium brightness subrange 618 and the high threshold 634 of the low brightness subrange 620. Overlapping region 650 is defined by the low threshold 636 of the low brightness subrange 620 and the high threshold 638 of the very low brightness subrange 622.

In one embodiment, the amount of overlap for each of the regions 644 is between 0 and 80% (inclusive) of the range value of the smaller of the adjacent subranges 614. A range value for purposes of determine subrange overlap is the absolute value of the difference between a value associated with one end of a subrange or overlap region and a value associated with the other end of the subrange or overlap region. For example, the range of the overlapping region 646 may have a range value between 0% and 80% inclusive of the smaller of the range values represented by subranges 616 or 618. By way of further illustrative example, if the brightness condition scale 608 were normalized to values ranging from zero to thirty inclusive, and if a high subrange 616 was defined by a low threshold 628 of twenty and a high threshold 626 corresponding to a value of thirty, then the range value of the upper subrange would be ten, or the absolute value of the different between twenty and thirty. An adjacent medium subrange 618, spanning a length or having a range value of sixteen could overlap the high subrange, or have an overlap region range value of between zero (0% of 10, the range value of the upper, and smaller of the adjacent subranges 616 and 618) up to eight (80% of 10, the value of the upper and smaller of the adjacent subranges 616 and 618). In other words, the medium subrange is allowed to have a high threshold 630 of between 20 and 28 representing a zero to eighty percent overlap with the high subrange 616 which in this illustrative example spans values 20 to 30. In one embodiment, the overlapping regions are greater than or equal to five percent of the range value of either adjacent subrange. In another embodiment, the overlapping regions are less than or equal to sixty-nine percent of the smaller range value of adjacent subranges.

It will be appreciated that this overlapping subrange configuration allows a point or value of the brightness condition scale 608, in certain situations, to correspond with an overlapping region 644, and thus compare with two subranges 614 simultaneously. For example, the calculated value y6 representing point 654 corresponds 642 to the overlapping region 648. Thus, the calculated value y6 compares to both the medium brightness condition associated with subrange 618 and the low brightness condition associated with subrange 620. One advantage of this configuration is that it reduces a flickering phenomenon that could occur at points on the brightness condition scale where adjacent subranges 614 meet, but do not overlap. For example, were the value of the low threshold 636 of the medium brightness condition subrange 618 to be equal to the value of the high threshold 634 of the low brightness condition subrange 620, then a continually calculated and recalculated value y could hover or move slightly above or below a point corresponding or compared to the equal values of 634 and 636. This slight movement above and below a joint threshold could cause the calculated value "y" to bounce back and forth between two subranges causing one or more visual indicators to repeatedly illuminate at different brightness levels over short amount of time. This could be annoying to the user. By overlapping the subranges 614, the high and low threshold values of adjacent subranges are not equal. Thus, as the imager and/or image signal processor outputs cause the decrease of the calculated value from y1 643 to y2 645 for example, the brightness condition level setting would change from the high brightness level to the medium brightness level because the calculated value moved passed the low threshold 628 of subrange 616 into subrange 618 (see y2 corresponding to point or value 645). However, because of the overlap, the calculated value would not cause the brightness condition level to change back to high until the current calculated value had risen above the high threshold value 630 of the medium brightness condition subrange (see y5 corresponding to point or value 651). This minimizes or reduces quick light emission fluctuations by one or more of the visual indicators.

With certain combinations of image signal and processed image signals, function 603 may yield a range of calculated values "y" 604 that only correlate to an actual brightness condition over certain range of the calculated values. Values outside the range, for example above 660 or below 662 the range, may not be in a one-to-one correspondence with actual brightness conditions. In this situation, all of the values 660 above the range and all the values 662 below the range may be artificially assigned a value such as y7 or y8 respectively that are within the range so that a brightness condition may be determined for all values of "y" 604 for the given combination of "x" 602 values.

It will be appreciated that although calculated values, brightness condition scale values, subrange threshold values and end values of the brightness condition scale are discussed in terms of integers for purposes of describing the illustrated example, these values may be real numbers and the range of calculated values "y" represented by the brightness condition scale 608, the subranges 614, and the overlapping regions 644 may include real numbers. It will further be appreciated that the size or amount of the scale 608, subranges 614 and overlapping regions 644 are merely illustrative and do not necessarily represent actual values of the scale and subranges used by the processor. It will further be appreciated that the vertical nature of the scale is merely illustrative. The scale generally increases or decreases numerically from one end 610 to the other 612. Thus references to "above", "below", "higher", "lower" may or may not mean greater than or less than.

Figures 7, 7A:
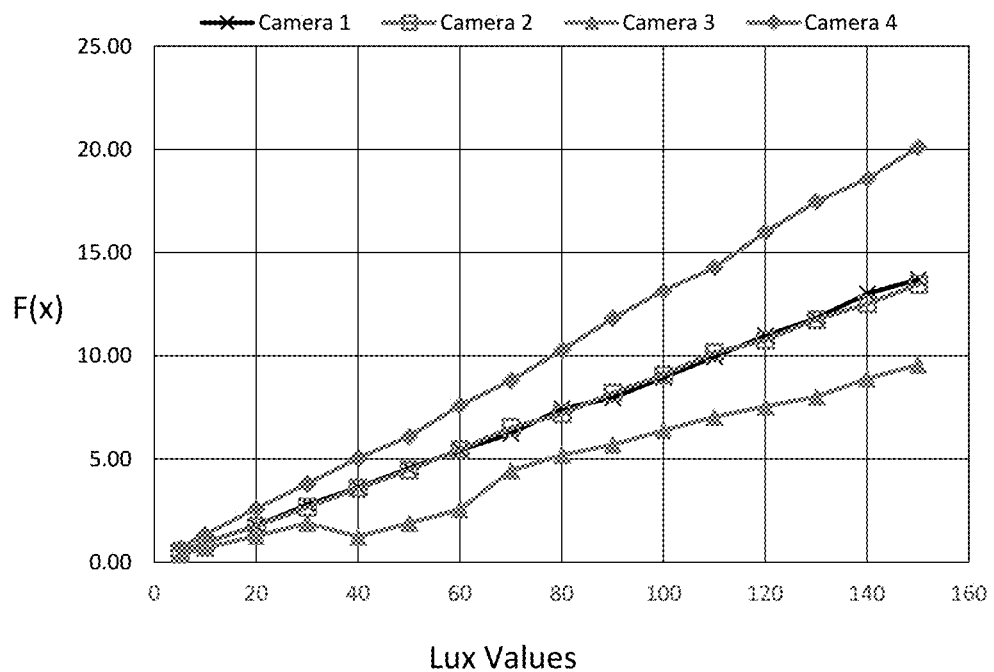
FIG. 7 is a graph plotting calculated values derived from outputs of four different videophone camera units against lux values according to an exemplary embodiment.
FIG. 7a is a table showing the calculated values of FIG. 7 derived from outputs of four different videophone camera units at various lux values in an area according to an exemplary embodiment.

Turning now to FIG. 7, a graph is shown plotting a correlation between calculated values f(x) along the y-axis and lux meter values along the x-axis. For the purposed of this graph, four cameras were used, each have a different lens. Each camera was placed in a room with the lux meter. The brightness level of the room was manually increased and calculated values F(x) were determined at the Lux values shown in the graph. It is generally understood that a room measuring a Lux value of 5 is dark and a room measuring a Lux value of 150 is very bright. Accordingly, a low brightness condition may correspond to Lux values ranging from about 0 to about 50, a medium brightness condition may correspond to Lux values ranging from about 50 to about 100, and a high brightness condition may correspond to Lux values range from about 100 to about 150. It will be appreciated that these lux value ranges may be confirmed or determined in any number of ways, including without limitation, obtaining customer feedback, using focus groups or sample studies, or taking a survey of what lux values people associate with darkly lit, medium lit, and well-lit rooms. In one embodiment, a minimum Lux value and a maximum lux value define a range of brightness conditions that are then equally divided into the number of desired brightness level subranges.

At each of the Lux Value levels 5, 10, 20, 30, up to 150, the image signal processor of each of the cameras in the room provided a mean luma value, a gain value and an exposure value. These values were converted into a calculated value F(x) for each camera at each of the lux value levels shown in the graph. The function or formula used to determine the calculated values shown in FIG. 7 was:

$$(a*\text{mean luma value})/(b*\text{gain value}*c*\text{exposure value})=\text{calculated value} \quad (3)$$

where a, b, and c, where values greater than or equal to 0.01 and less than or equal to 100. The calculated value was plotted for each camera at each of the indicated Lux Values. As can be seen, each camera graph is substantially linear through the range of lux values. It will be appreciated that this indicates that the calculated values derived from this particular combination of imager and/or image signal processor outputs maps or correlates substantially uniformly to actual brightness conditions in the room. Accordingly, these values can be used to determine a brightness condition and automatically adjust the brightness level of one or of the videophone's visual indicators.

It will be appreciated by those of skill in the art that there are a number of various combinations of imager and image signal processor values that, when converted into calculated values map or correlate substantially uniformly to Lux values taken from the same room to form a linear plot line. In other words, in other embodiments, different imager and/or image signal processor values may be used to determine a brightness level in a room and adjust the light emission from a videophone accordingly.

FIG. 7a is table showing the calculated values taken at each Lux value level for each of the four cameras of FIG. 7. Formatting the data points in this manner facilitates the determination of how much overlap there should be between adjacent brightness condition subranges. For example, by looking at the values at Lux value level 5, it can be seen that the lowest calculated value is 0.37. The values at Lux value level 60 (just within a predetermined middle brightness condition range highlighted in the middle) show an average of the four cameras of about 5. Looking back at the calculated values associated with Lux value 30 (just back within a predetermined low brightness condition range highlighted at the top of the table) the average value is about 3. Using this same process, in can be seen that the calculated values at Lux value level 120 (just within a predetermined high brightness condition range highlighted at the bottom of the table) average around 10. Looking back at the calculated values at Lux value level 100 (the high end of the predetermined medium brightness condition highlighted area) and it will be seen that the calculated values average around 9. Finally, the high calculated value associated with Lux value level 150 is 20.10. Accordingly, a brightness condition scale of calculated values could range from about 0.37 to about 20.10. The table helps determine how the brightness condition scale could be divided up into overlapping subranges according to the process described above. It can be seen that a low brightness condition subrange could be between about 0.37 and about 5, a medium brightness condition subrange could be between about 3 and 10, and a high brightness condition subrange could be between about 9 and 20.10.

It will be appreciated that there are a number of ways to determine the values of a brightness condition scale and its various subranges corresponding to brightness conditions of a room. Indeed, a combination of imager and/or image signal processor values might lead to an inverted linear graph, where low Lux values equate to high calculated values and vice versa. Additionally, various light frequencies could be used to confirm a correlation between calculated values from camera outputs and actual brightness conditions. For example, cameras could be tested in low incandescent bulb conditions to bright LED conditions. The lighting could be used to simulate an office environment, an outdoor environment, or warmly lit living room.

Figure 8:
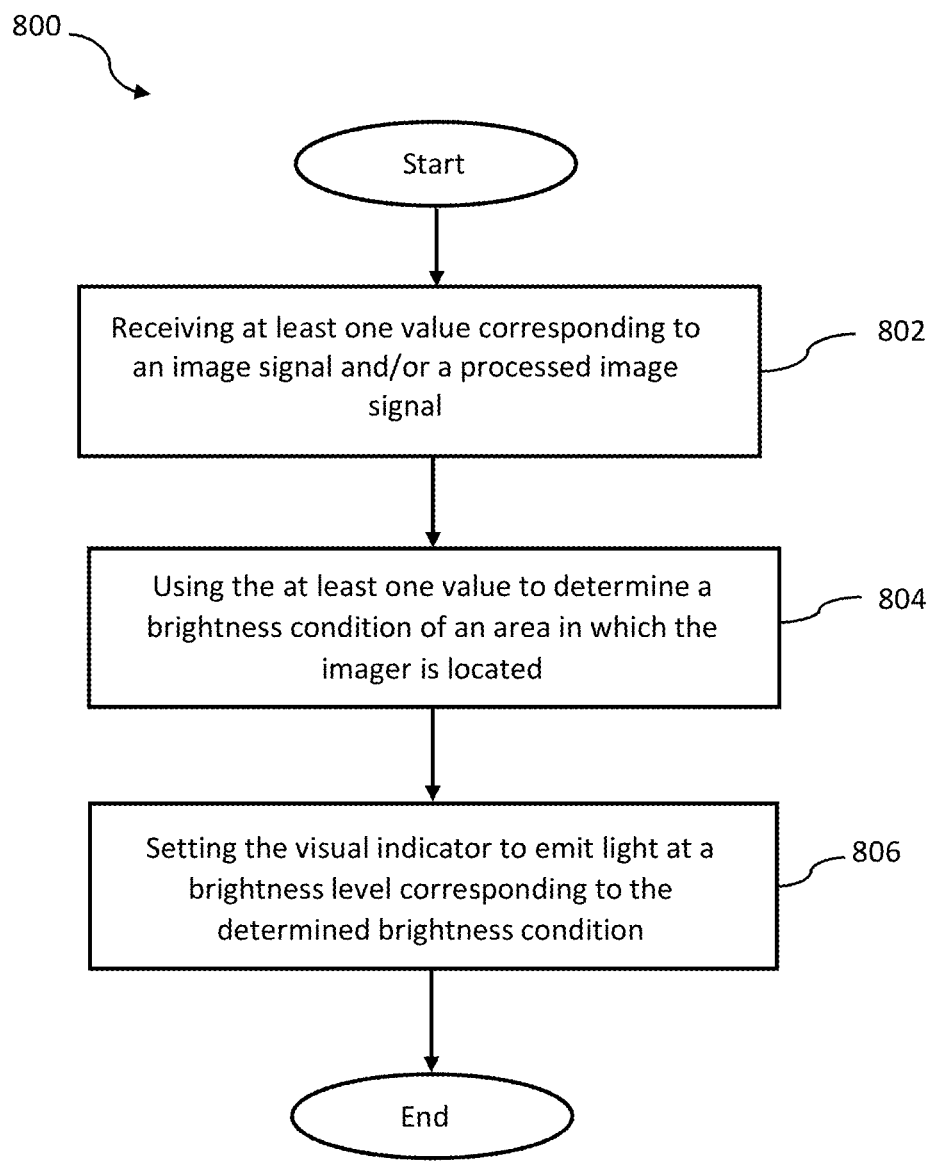
FIG. 8 is a flowchart of a method of automatically adjusting a brightness level of a videophone visual indicator according to an exemplary embodiment.
Figure 9:
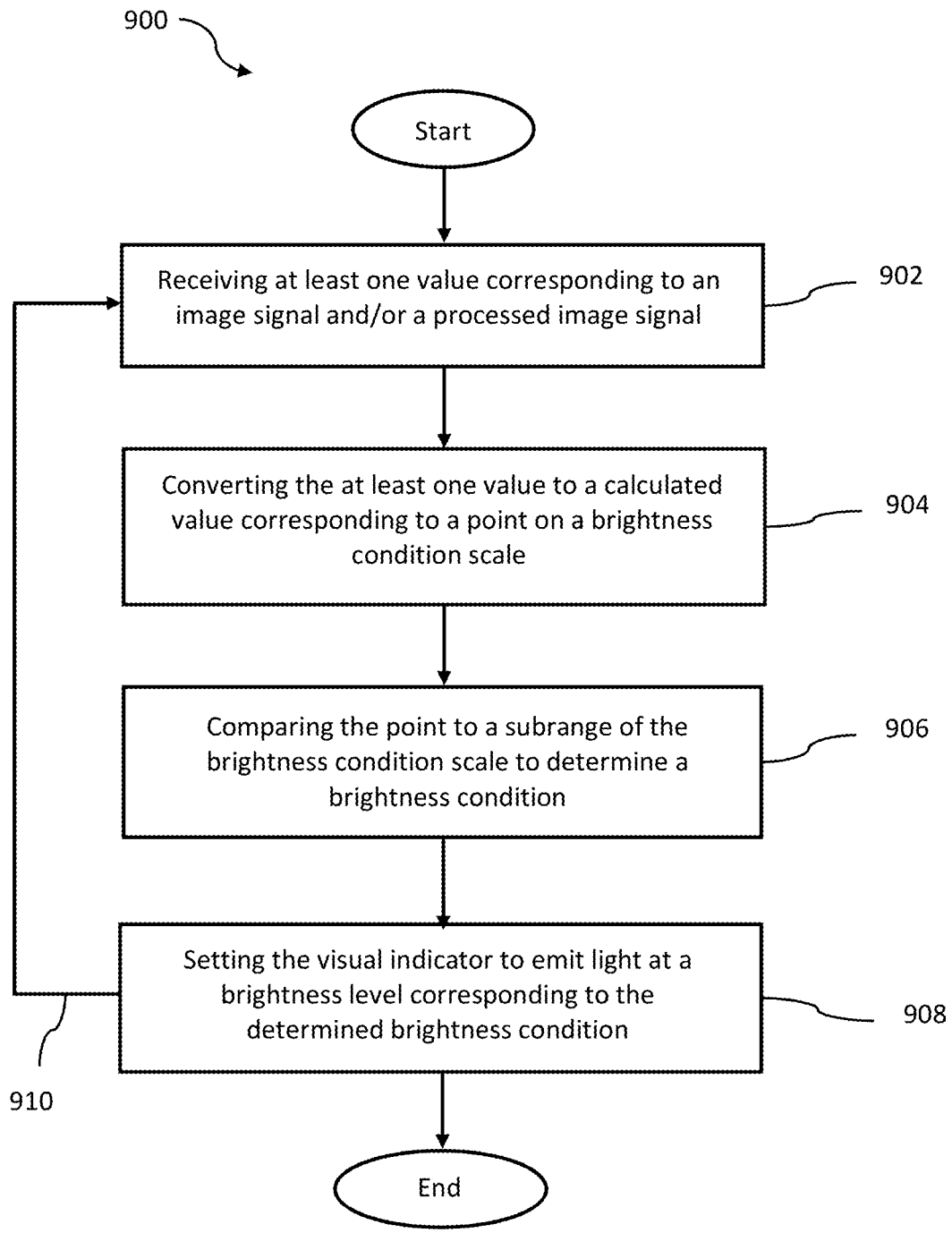
FIG. 9 is a flowchart of a method of automatically adjusting a brightness level of a videophone visual indicator according to an exemplary embodiment.

FIGS. 8 and 9 illustrate example methods relating to automatically adjusting the brightness level of a videophone visual indicator. The videophone may contain a visual indicator, an imager and an image signal processor. FIG. 8 illustrates an example method 800 that facilitates using the imager and/or the image signal processor of the videophone to automatically adjust the brightness level of one or more visual indicators of the videophone. In one embodiment, the method 800 includes the step of receiving 802 at least one value corresponding to at least one of an image signal and a processed image signal from one or both of the imager and the image signal processor. It will be appreciated that the image signal may be received by way of the image signal processor. In certain embodiments, the image signal processor processes the image signal into a processed image signal relating to some aspect of the image. The image signal may include raw data from the imager. The processed image signal may be any value derived from an image signal processor or image signal processor output. Processed image signals may include without limitation, a color value, a brightness value, a gamma value, a luma value, a gain value, a contrast value, a noise value, an exposure value, a range value, a signal-to-noise ratio value, and edge value, a sharpness value, a Bayer transformation value, a demosaicing value, a white balance value, a focus value, a lens correction value, a CMOS value, a CCD value, weighted values of each of the foregoing and combinations of each of the forgoing.

The method 800 includes using 804 the at least one value corresponding to at least one of an image signal and a processed image signal to determine a brightness condition of an area in which the imager is located. In one embodiment, the method 800 includes using 804 just one or more image signals. In another embodiment, the method 800 includes using 804 just one or more processed image signals. In yet another embodiment, the method 800 includes using 804 a combination of image signals and processed image signals to determine a brightness condition of an area in which the imager is located.

The method 800 includes setting 806 the visual indicator to emit light at a brightness level corresponding to the determined brightness condition. The step of setting 806 the visual indicator to emit light at a brightness level corresponding to the determined brightness condition includes without limitation storing, sending and/or otherwise utilizing a value, signal or parameter corresponding to the brightness level or determined brightness condition.

FIG. 9 illustrates an example method 900 that facilitates using the imager and/or the image signal processor of the videophone to automatically adjust the brightness level of one or more visual indicators of the videophone. In one embodiment, the method 900 includes the step of receiving 902 at least one value corresponding to at least one of an image signal and a processed image signal from one or both of the imager and the image signal processor. It will be appreciated that the image signal may be received by way of the image signal processor. In certain embodiments, the image signal processor processes the image signal into a processed image signal relating to some aspect of the image. The image signal may include raw data from the imager. The processed image signal may be any value derived from an image signal processor or image signal processor output. Processed image signals may include without limitation, a color value, a brightness value, a gamma value, a luma value, a gain value, a contrast value, a noise value, an exposure value, a range value, a signal-to-noise ratio value, and edge value, a sharpness value, a Bayer transformation value, a demosaicing value, a white balance value, a focus value, a lens correction value, a CMOS value, a CCD value, weighted values of each of the foregoing and combinations of each of the forgoing.

The method 900 includes converting 904 the at least one value corresponding to at least one of an image signal and a processed image signal to a calculated value. The calculated value may to a point or value on a brightness condition scale. The brightness condition scale may correspond to a brightness condition of an area in which the imager is located. In one embodiment, the method 900 includes converting 904 just one or more image signals. In another embodiment, the method 900 includes converting 904 just one or more processed image signals. In yet another embodiment, the method 900 includes converting 904 a combination of image signals and processed image signals to determine a calculated value. In one embodiment, converting 904 the at least one value corresponding to at least one of an image signal and a processed image signal to a calculated value includes dividing a weighted luma value by the product of a weighted gain value and a weighed exposure value.

The method 900 includes the step of comparing 906 the calculated value or corresponding point to a plurality of a subranges of the brightness condition scale, each subrange corresponding to a particular brightness condition. The comparison facilitating the determination a brightness condition of an area in which the imager is located. In one embodiment, the brightness condition scale, or in other words the range of calculated values, is divided up into three subranges. The values of each subrange correlate to a high brightness condition, a medium brightness condition and a low brightness condition respectively. In one embodiment, the brightness condition scale is divided up into four subranges corresponding to a high, medium, low and very low brightness condition. Accordingly, the comparison of the calculated value or point on the brightness condition scale with any of its subranges allows the determination of a particular high, medium, low, or other brightness condition.

The method 900 may include the step of setting 908 the visual indicator to emit light at a brightness level corresponding to the determined brightness condition. The step of setting 908 the visual indicator to emit light at a brightness level corresponding to the determined brightness condition includes without limitation storing, sending and/or otherwise utilizing a value, signal or parameter corresponding to the brightness level or determined brightness condition. In one embodiment, the brightness level setting corresponding to as default brightness condition level for use as, among other things, a default brightness level setting for when a videophone has been inactive for a predetermined period of time.

The method 900 steps may repeat 910 such that image signals and/or processed image signals can be continuously used to determine a current brightness condition. In one embodiment, at least one of the subranges of the brightness condition scale overlaps with an adjacent subrange. In this configuration, it will be appreciated that as image signals and/or processed image signals are continually converted into calculated values, subsequent calculated values may be decreasing, thus passing through an overlapping region defined by a lower threshold of a first subrange and a higher threshold of an adjacent second subrange that contains lower values than the first subrange. The subsequent calculated values may decrease to point below the lower threshold of the first brightness condition subrange to enter into the adjacent second brightness condition subrange. This may cause a visual indicator to emit light at a new brightness level setting. However, for a return of the brightness level setting corresponding to the first subrange, subsequent calculated values would have to increase through the overlapping region to a point greater than the value of the high threshold of the second subrange.

Although the methods and processes disclosed herein may describe the operations as a sequential process, many of the operations can be performed in parallel or concurrently. In addition, the order of the operations of disclosed embodiments may be rearranged. The methods or processes described herein may also have various steps added, omitted, or combined. Thus, changes may be made with regards to the sequence of steps without departing from the spirit or scope of the present disclosure.

In one embodiment, a non-transitory computer-readable medium is configured to store code, software, and/or program instructions that, when executed on one or more processors, automatically adjust a brightness level of a videophone visual indicator. This code, software and/or program instructions may include the method steps, processes, functions, features, aspects and algorithms described herein.

Computer-readable media includes both computer storage media and communication media including any transmission medium that facilitates transfer of a computer program from one place to another. A storage medium may be any available media that can be used to carry or store desired program code in the form of instructions or data structures and that can be accessed by a computer. By way of example, and not limitation, such computer-readable media may include RAM (e.g. SDRAM, DDR, RDRAM, SRAM, etc.), ROM, EEPROM, or CD-ROM. Computer-readable media may include compact discs (CD), laser discs, optical discs, digital versatile discs (DVD), floppy discs, Blu-ray discs or any disks or discs that reproduce data magnetically or optically. Computer-readable media may also include transmission media or signals such as electrical, electromagnetic, or digital signals, conveyed via a communication medium such as network and/or a wireless link.

Additionally, various connections may be termed a computer-readable medium. For example, if software is transmitted from a website, server, or other remote source using a coaxial cable, fiber optic cable, twisted pair, and digital subscriber line (DSL), wireless technologies such as infrared, radio, and microwave, and the like, then the preceding types of connections can be included in the definition of computer-readable media.

Computer-readable media may be packaged with a compatible device, such as the devices, components and/or units of the videophone described herein, or may be provided separately from such devices. In addition code, software, and/or program instructions may be encoded and transmitted via wired optical, and/or wireless networks conforming to a variety of protocols, including the Internet, thereby allowing distribution through many means including Internet download. Any such computer-readable medium may reside on or within a single computer product (e.g. a hard drive, a CD, or an entire computer system), and may be present on or within different computer products within a system or network.

Various aspects of the embodiments described herein are referred to as having, or as being implemented by, a "unit", "device", "component", or "module". The labels given these items should not be used to limit the scope of the embodiments. These items and any other items used to implement the various functions, features, aspects, algorithms, methods, or processes of the embodiments described herein (collectively and severally "implementing structures") may be configured in a variety of ways without departing from the scope of the present invention. These implementing structures may include hardware, software, firmware or a combination of these. An implementing structure may denote a software or a hardware component such as a field programmable gate array (FPGA), an application specific integrated circuit (ASIC), or a programmable-logic device and may perform any role or function.

An implementing structure may be configured to be in an addressable storage medium or to execute one or more processors. Accordingly, as an example, a implementing structure may include elements such as software elements, object-oriented software elements, class elements, and task elements, processes, functions, attributes, procedures, subroutines, segments of program codes, drivers, firmware, micro-codes, circuits, data, database, data structures, tables, arrays, logic blocks and variables.

Functions provided in "implementing structures" may be combined as a smaller number of implementing structures or further divided into additional implementing structures. Implementing structures may be localized on one computer or distributed between two or more computers. In addition, implementing structures can execute from various computer-readable media having various data structures stored thereon. Implementing structures may communicate by way of local or remote processes, for example, as a signal with data packets between one module interacting with another module in a local device or system, distributed device or system, or across a network such as the Internet with other devices or systems.

Implementing structures may be configured to perform various operations described herein. Those skilled in the art will appreciate that, depending on implementation, such configuration can be accomplished through design, setup, interconnection, and/or programming of the particular implementing structure and that, again depending on implementation, a configured implementing structure might or might not be reconfigurable for a different operation.

It should be noted that the methods, systems, and devices discussed above are intended merely to be examples and should not be interpreted to limit the scope of the invention. Various embodiments may omit, substitute, or add various procedures or components as appropriate. Various modifications and changes may be made as would be obvious to a person skilled in the art having the benefit of this disclosure. Also, features described with respect to certain embodiments may be combined in various other embodiments. Also, it should be emphasized that technology evolves and the present invention is intended to embrace all such modifications, changes and evolutions. Thus, various modifications, alternative constructions, and equivalents may be used without departing from the spirit of the invention.

The scope of the present invention is defined by the appended claims.

What is claimed is:

1. A videophone, comprising:
   a camera unit, comprising:
      an imager configured to receive an input and convert the input into an image signal; and
      an image signal processor in operable communication with the imager, the image signal processor configured to do at least one of receive an image signal and process an image signal;
   a visual indicator for indicating a call status using light emission, the visual indicator configured to emit light at two or more brightness levels;
   a memory configured to store instructions; and
   a main processor operatively coupled with the memory and configured to execute the instructions to perform operations, the operations comprising:
      the main processor receiving at least one value corresponding to at least one of an image signal and a processed image signal from one or both of the imager and the image signal processor;
      the main processor using the at least one value corresponding to at least one of an image signal and a processed image signal to determine a brightness condition of an area in which the imager is located; and
      the main processor setting the visual indicator to emit light at a brightness level corresponding to the determined brightness condition.

2. The videophone of claim 1, wherein the visual indicator comprises at least one of an indicator light and an area light.

3. The videophone of claim 2, wherein each of the indicator light and the area light are configured to emit light at a plurality of brightness levels, each brightness level corresponding to a brightness condition of an area in which the imager is located.

4. The videophone of claim 1, further comprising a screen.

5. The videophone of claim 4, wherein the visual indicator comprises the screen.

6. The videophone of claim 5, wherein the screen is configured to emit light at a plurality of brightness levels, each brightness level corresponding to a brightness condition of an area in which the imager is located.

7. The videophone of claim 1, wherein using the at least one value corresponding to at least one of an image signal and a processed image signal to determine a brightness condition of an area in which the imager is located comprises:
   converting the at least one value to a calculated value corresponding to a point on a brightness condition scale, the brightness condition scale corresponding to a brightness condition of an area in which the imager is located, and wherein the brightness condition scale comprises at least two subranges, each subrange corresponding to a particular brightness condition; and
   comparing the point to a subrange of the brightness condition scale to determine a corresponding brightness condition of an area in which the imager is located.

8. The videophone of claim 7, wherein at least one of the subranges of the brightness condition scale overlaps with an adjacent subrange to create an overlapping region between the two subranges.

9. The videophone of claim 8, wherein the overlapping region comprises a range value greater than or equal to five percent of a range value corresponding to an adjacent subrange.

10. The videophone of claim 1, wherein the image signal comprises raw data from the imager.

11. The videophone of claim 1, wherein the processed image signal comprises one or more values selected from a color value, a brightness value, a gamma value, a luma value, a gain value, a contrast value, a noise value, an exposure value, a range value, a signal-to-noise ratio value, an image size value, an image edge value, a sharpness value, a low light performance value, a spatial resolution value, a color imaging fidelity value, a Bayer transformation value, a demosaicing value, a white balance value, a focus value, a lens correction value, a CMOS value, a CCD value, and a weighted value of any of the foregoing.

12. The videophone of claim 11, wherein converting the at least one value to a calculated value comprises dividing a weighted luma value by the product of a weighted gain value and a weighed exposure value.

13. The videophone of claim 1, wherein the main processor comprises the image signal processor.

14. A method for automatically adjusting a brightness level of a videophone, the videophone comprising a visual indicator for indicating a call status using light emission, the visual indicator configured to emit light at two or more brightness levels, an imager, and at least one processor, the method comprising:
   at least one processor receiving at least one value corresponding to at least one of an image signal and a processed image signal from one or both of the imager and an image signal processor;
   at least one processor using the at least one value corresponding to at least one of an image signal and a processed image signal to determine a brightness condition of an area in which the imager is located; and
   at least one processor setting the visual indicator to emit light at a brightness level corresponding to the determined brightness condition of the area.

15. The method of claim 14, wherein the visual indicator comprises at least one of a videophone indicator light, a videophone area light, and a videophone screen.

16. The method of claim 14, wherein using the at least one value corresponding to at least one of an image signal and a processed image signal to determine a brightness condition of an area in which the imager is located comprises:
   converting the at least one value to a calculated value corresponding to a point on a brightness condition scale, the brightness condition scale corresponding to a brightness condition of an area in which the imager is located, wherein the brightness condition scale comprises at least two subranges, each subrange corresponding to a particular brightness condition; and
   comparing the point to a subrange of the brightness condition scale to determine a brightness condition of an area in which the imager is located.

17. The method of claim 16, wherein at least one of the subranges of the brightness condition scale overlaps with an adjacent subrange to create an overlapping region between the two subranges.

18. The method of claim 17, wherein the overlapping region comprises a range value greater than or equal to five percent of a range value corresponding to an adjacent subrange.

19. The method of claim 16, wherein the image signal comprises raw data from the imager.

20. The method of claim 16, wherein the processed image signal comprises one or more values selected from a color value, a brightness value, a gamma value, a luma value, a gain value, a contrast value, a noise value, an exposure value, a range value, a signal-to-noise ratio value, an image size value, an image edge value, a sharpness value, a low light performance value, a spatial resolution value, a color imaging fidelity value, a Bayer transformation value, a demosaicing value, a white balance value, a focus value, a lens correction value, a CMOS value, a CCD value, and a weighted value of any of the foregoing.

21. The method of claim 20, wherein converting the at least one value to a calculated value comprises dividing a weighted luma value by the product of a weighted gain value and a weighed exposure value.

22. The method of claim 14, wherein the at least one processor comprises the image signal processor.

23. A non-transitory computer-readable medium storing program instructions that, when executed on one or more processors of a videophone automatically adjust a brightness level of a videophone visual indicator configured to indicate a call status using light emission, the instructions comprising:
   one or more processors receiving at least one value corresponding to at least one of an image signal and a processed image signal from one or both of an imager and an image signal processor;
   one or more processors using the at least one value corresponding to at least one of an image signal and a processed image signal to determine a brightness condition of an area in which the imager is located; and
   one or more processors setting a visual indicator to emit light at a brightness level corresponding to the determined brightness condition.

24. The medium of claim 23, wherein the one or more processors comprise the image signal processor.

25. The medium of claim 23, wherein using the at least one value corresponding to at least one of an image signal and a processed image signal to determine a brightness condition of an area in which the imager is located comprises the steps of:
   converting the at least one value to a calculated value corresponding to a point on a brightness condition scale, the brightness condition scale corresponding to a brightness condition of an area in which the imager is located, wherein the brightness condition scale comprises at least two subranges, each subrange corresponding to a particular brightness condition; and
   comparing the point to a subrange of the brightness condition scale to determine a brightness condition of an area in which the imager is located.

26. The medium of claim 25, wherein at least one of the subranges of the brightness condition scale overlaps with an adjacent subrange to create an overlapping region between the two subranges.

27. The medium of claim 26, wherein the processed image signal comprises one or more values selected from a color value, a brightness value, a gamma value, a luma value, a gain value, a contrast value, a noise value, an exposure value, a range value, a signal-to-noise ratio value, an image size value, an image edge value, a sharpness value, a low light performance value, a spatial resolution value, a color imaging fidelity value, a Bayer transformation value, a demosaicing value, a white balance value, a focus value, a lens correction value, a CMOS value, a CCD value, and a weighted value of any of the foregoing.

28. The medium of claim 27, wherein converting the at least one value to a calculated value comprises dividing a weighted luma value by the product of a weighted gain value and a weighed exposure value.

* * * * *